United States Patent [19]

Koden et al.

[11] Patent Number: 5,108,650
[45] Date of Patent: Apr. 28, 1992

[54] LIQUID CRYSTAL DEVICE

[75] Inventors: Mitsuhiro Koden, Nara; Makoto Shiomi, Tenri; Fumiaki Funada, Yamatokoriyama; Keizo Ito, Ibaraki; all of Japan

[73] Assignee: Sharp Kabushiki Kaisha, Osaka, Japan

[21] Appl. No.: 594,972

[22] Filed: Oct. 10, 1990

[30] Foreign Application Priority Data

Oct. 11, 1989 [JP] Japan .................................. 1-265487

[51] Int. Cl.$^5$ ......................... C09K 19/52; G02F 1/13
[52] U.S. Cl. .................................. 252/299.01; 359/103
[58] Field of Search ........... 252/299.01, 299.1, 299.61, 252/299.62, 299.63, 299.64, 299.65, 299.66, 299.67, 299.68; 350/350 R, 350 S; 359/103

[56] References Cited

U.S. PATENT DOCUMENTS

| | | | |
|---|---|---|---|
| 4,882,083 | 11/1989 | Terashima et al. | 252/299.61 |
| 4,918,213 | 4/1990 | Nohira et al. | 558/271 |
| 4,921,632 | 5/1990 | Nakamura et al. | 252/299.1 |
| 4,931,208 | 6/1990 | Furakawa et al. | 252/299.61 |

FOREIGN PATENT DOCUMENTS 2182037 5/1987 United Kingdom.

OTHER PUBLICATIONS

Japanese Unexamined Patent Publication No. SHO63 (1988)-307837.
Chandani et al., "Antiferroelectric Chiral Smetic Phases Responsible for the Tristable Switching in MHPOBC"]Japanese Journal of Applied Physics, vol. 28, No. 7, Jul. 1989, pp. L1265-1268.
"High Molecular Ferroelectric Liquid Crystal and Molecular Design Thereof" Kinov Zairyou, No. 9, 1989, pp. 43-48.
Y. Suzuki, et al. "New Flourine-Containing Ferroelectric Liquid Crystal Compounds Showing Tristable Switching" Liquid Crystals, Vol. 6, No. 2, 1989, pp. 167-174
European Patent Publication 0,327,349 A2, Aug. 9, 1989
European Patent Publication 0,332,392 A2, Sept. 13, 1989

Primary Examiner—Robert L. Stoll
Assistant Examiner—Shean C. Wu
Attorney, Agent, or Firm—David G. Conlin; Donald R. Castle

[57] ABSTRACT

An antiferroelectric liquid crystal display device including a specific antiferroelectric liquid crystal composition layer comprising at least one compound represented by the following general formula (I):

$$R^1-(\bigcirc)_m-COO-(\bigcirc)_n-COO-\overset{*}{C}H-R^2 \quad \underset{CF_3}{|} \quad (I)$$

wherein $R^1$ represents an optionally substituted alkyl or alkoxy group having 1 to 15 carbon atoms, $R^2$ represents an optionally substituted alkyl group having 1 to 15 carbon atoms, X represents a hydrogen or fluorine atom, m and n independently represents an integer 1 or 2, and * represents an asymmetric carbon atom, and at least one compound represented by the following general formula (II):

$$R^3-(\bigcirc)_k-A-X-(\bigcirc)-Y-R^4 \quad (II)$$

wherein $R^3$ represents an optionally substituted alkyl or alkoxy group, having 1 to 15 carbon atoms, $R^4$ represents an optionally substituted alkyl group, having 1 to 15 carbon atoms, A represents $\bigcirc$ or $\bigcirc_N^N$.

X represents a single bond or —COO—, Y represents a single bond, —O—, or —COO—, and k represents an integer 0 or 1.

7 Claims, 23 Drawing Sheets

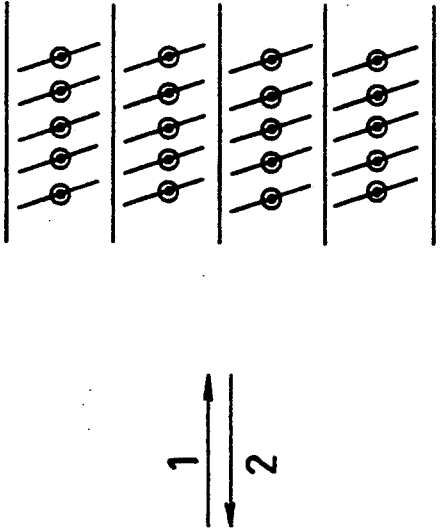
FIG. 1(a) WHEN NO VOLTAGE IS APPLIED (STATE 2)
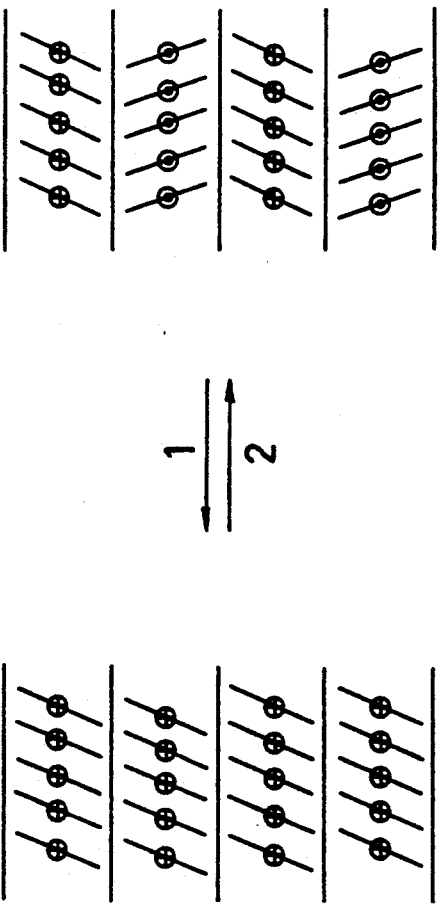
FIG. 1(c) WHEN VOLTAGE IS APPLIED (STATE 1)
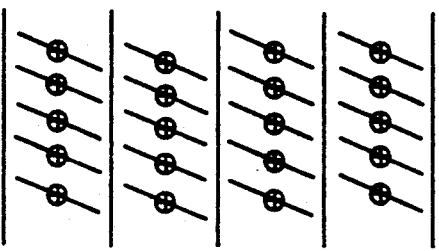
FIG. 1(b) WHEN VOLTAGE IS APPLIED (STATE 3)

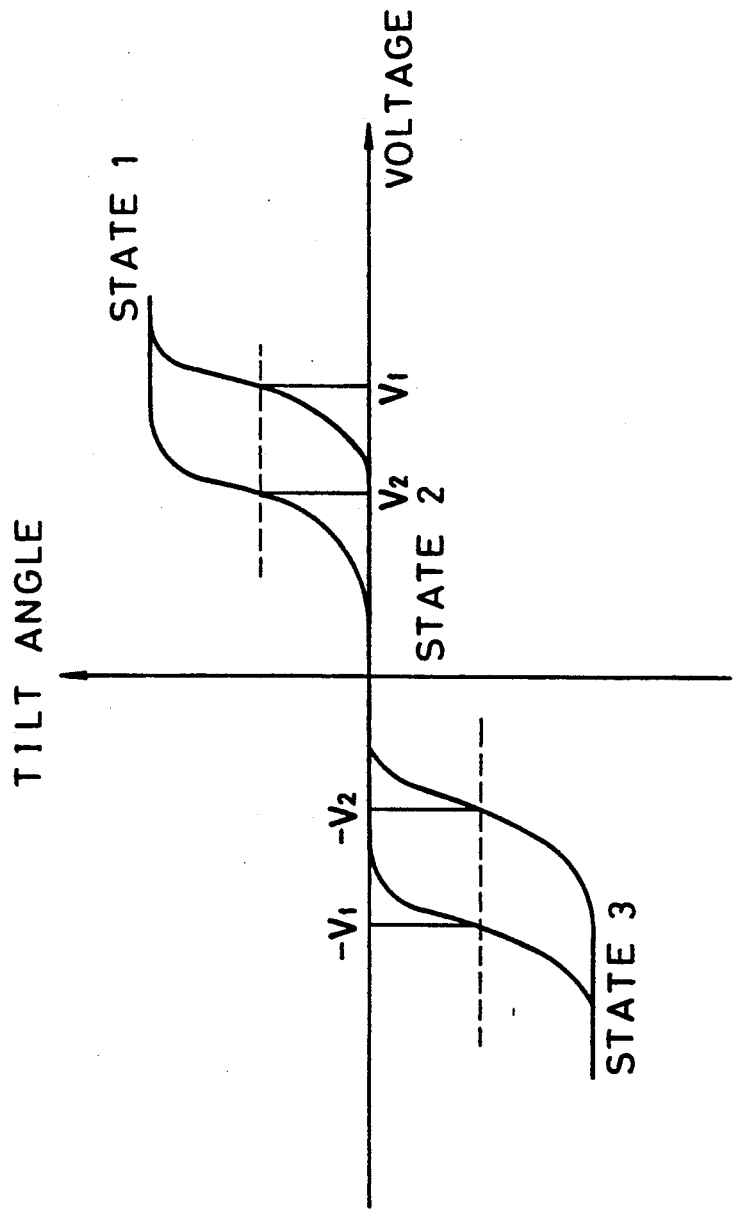

FIG. 5

LIQUID CRYSTAL DEVICE

BACKGROUND OF THE INVENTION

1. Field of the Invention

This invention relates to a liquid crystal device, and more particularly to a liquid crystal device comprising an antiferro-electric liquid crystal composition showing tristable switching.

2. Description of the Prior Art

In the recent years, a ferroelectric liquid crystal display device using a ferroelectric liquid crystal such as of chiral smectic C phase has been investigated (See N. A. Clark, et al, Appl. Phys. Left., 36, 899 (1980)). The display device has a wide view angle and permits a large capacity display of more than 1000 ×1000 lines, so that it has been expected to be promising. However, the device has such problem that good orientation and memory characteristic required for the display device cannot be readily realized in a practical cell and is likely to be influenced by a shock from the outside. The display device has to settle many tasks for realization.

On the other hand, there has been recently found a compound having a liquid crystal phase that shows tristable switching at lower temperature than that of the chiral smectic C phase above-mentioned, and a new display device related to this has been investigated (A. D. L. Chandani, et. al., Jpn. J. Apply. Phys., 27, L279 (1988)).

The newly found liquid crystal phase is not yet fully clarified and is expressed in various manner by investigators, for example, $S_\gamma^*$ phase (Japanese Unexamined Patent Publication HEI 1-213390/1989) or $SmC_A^*$ (Fukuda, the Japan Society for the Promotion of Science Information science organic materials, 142th Committee, 45th joint research materials, 34(1989)). The phase may be regarded as an antiferroelectric smectic phase having a helical structure wherein the long axes of molecules are tilted with respect to the layer plane. When the helices are set unwound, for example, by sealing the phase in a liquid crystal cell thinner than the helical pitch length, there is provided a molecular arrangement to cause dipoles to be canceled in each layer, as shown in FIG. 1(a). When electric field is applied in this state, dipoles may be changed in molecular arrangement to be aligned with each other along the direction of voltage as shown in FIGS. 1(b) or 1(c). Hence, for example, polarizing plates can be combined with the device to realize a bright or dark display. The relationship between the applied voltage and the tilt angle is as shown in FIG. 2, wherein three stable states 1 to 3 can be taken to draw a hysteresis curve. Therefore, the relationship may be used for driving liquid crystal display device.

Only a few compounds showing the above liquid crystal phase have been reported, for example, as follows. (Japanese Unexamined Patent Publication HEI 1-213390(1989); Y. Suzuki, et al., Proc, 2nd International Conference on Ferroelectric Liquid Crystals, P-106 (1989)).

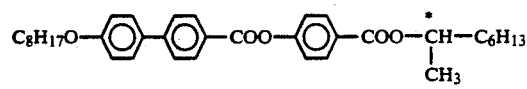

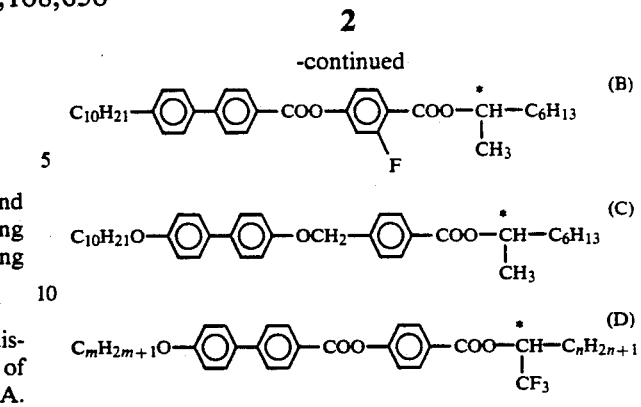

[n and m each denotes an integer of 6 to 12]

The abovementioned optically active biphenyl derivatives may be synthesized by the method as disclosed in Japanese Unexamined Patent Publication SHO 63-307837 (1988).

Although not impossible to produce liquid crystal devices by using a single compound which shows the above antiferroelectric liquid crystal phase, such liquid crystal devices are not fully satisfactory in that the temperature range showing tristable switching is narrow and a relatively higher voltage is required for controlling the switching.

SUMMARY OF THE INVENTION

The present invention has been accomplished under the foregoing situations, and an object thereof is to provide a liquid crystal device using an antiferroelectric liquid crystal composition that shows a switching characteristic at low voltage.

According to the present invention, there is provided a liquid crystal device which comprises a pair of substrates each provided with a voltage applying means, an orientation control layer disposed on at least one of the pair of substrates, and an antiferroelectric liquid crystal layer disposed between the pair of substrates, the antiferroelectric liquid crystal layer comprising a liquid crystal composition including at least one compound represented by the following general formula (1):

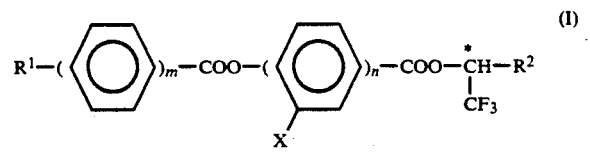

wherein $R^1$ represents an optionally substituted alkyl or alkoxy group, having 1 to 15 carbon atoms, $R^2$ represents an optionally substituted alkyl group having 1 to 15 carbon atoms, X represents a hydrogen or fluorine atom, m and n independently represent an integer 1 or 2, and * represents an asymmetric carbon atom, and at least one compound represented by the following general formula (II):

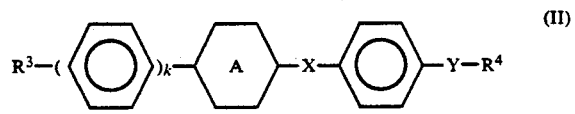

wherein $R^3$ represents an optionally substituted alkyl or alkoxy group, having 1 to 15 carbon atoms, $R^4$ represents an optionally substituted alkyl group, having 1 to 15 carbon atoms,

X represents a single bond or —COO—, Y represents a single bond, —O—, or —COO—, and k represents an integer 0 or 1.

BRIEF DESCRIPTION OF THE DRAWINGS

FIG. 1(a), (b) and (c) are diagrams illustrating a molecular arrangement in an antiferroelectric liquid crystal phase.

FIG. 2 is a diagram illustrating a relationship between the applied voltage and the tilt angle of an antiferroelectric liquid crystal.

FIGS. 5 to 7 are diagrams for explaining a method of driving a matrix type antiferroelectric liquid crystal device of the invention.

DETAILED DESCRIPTION OF THE PREFERRED EMBODIMENT

Figure 3:
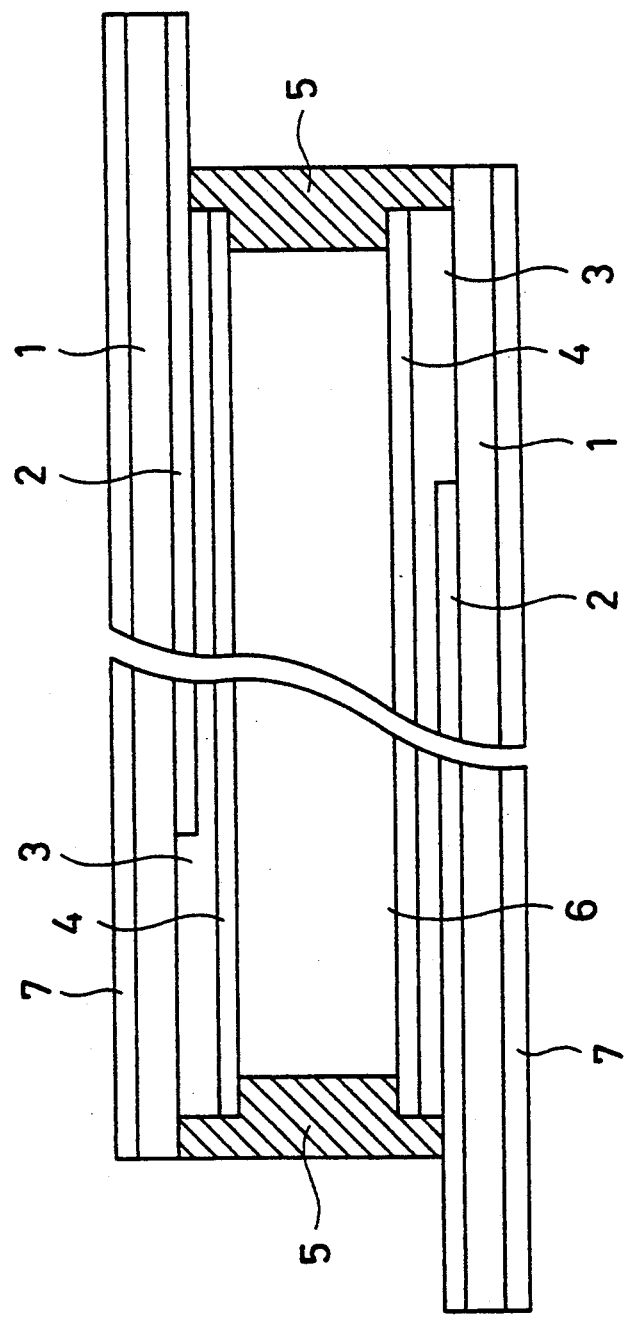
FIG. 3 is a sectional explanatory view showing a structure and a producing method of an antiferroelectric liquid crystal device of the present invention.

Specific examples of the group $R^1$ in the general formula (I) and the group $R^3$ in the general formula (II) include various alkyl groups or alkoxy groups with straight or branched chains, respectively, and such alkyl groups include methyl, ethyl, propyl, i-propyl, butyl, i-butyl, pentyl, 1- or 2-methylbutyl, hexyl, 1- or 3-methylpentyl, heptyl, 1- or 4-methylhexyl, octyl, 1-methylheptyl, nonyl, 1- or 6-methyloctyl, decyl, 1-methynonyl, undecyl, 1-methyldecyl, dodecyl, 1-methylundecyl, and the like, and such alkoxy groups includes methoxy, ethoxy, propoxy, i-propoxy, butoxy, i-butoxy, pentoxy, 1- or 2-methylbutoxy, hexyloxy, 1- or 3-methylpentoxy, heptyloxy, 1- or 4-methylhexyloxy, octyloxy, 1-methylheptyloxy, nonyloxy, 1- or 6-methyloctyloxy, decyloxy, 1-methylnonyloxy, undecyloxy, 1-methyldexyloxy, dedocyloxy, 1-methylundecyloxy and the like.

In the alkyl or alkoxy group, at least one hydrogen atom may be substituted with a fluorine atom, a chroline atom, a bromine atom, a cyano group, a trifluoromethyl group, or a nitro group. Also, the alkyl or alkoxy group may contain an asymmetric carbon atom in the chain thereof.

Specific examples of the group $R^2$ in the formula (I) and the group $R^4$ in the formula (II) include various alkyl groups including methyl, ethyl, propyl, i-propyl, butyl, i-butyl, pentyl, 1-or 2-methylbutyl, hexyl, 1- or 3-methylpentyl, heptyl, 1- or 4-methylhexyl, octyl, 1-methylheptyl, nonyl, 1- or 6-methyloctyl, decyl, 1-methynonyl, undecyl, 1-methyldecyl, dodecyl, 1-methylundecyl and the like.

In the alkyl groups, at least one hydrogen atom may be substituted with a fluorine atom, a chroline atom, a bromine atom, a cyano group, a trifluoromethyl group, or a nitro group. Also, the alkyl group may contain an asymmetric carbon atom in the chain thereof.

Optically active compounds represented by the general formula (I) may be prepared, for example, by the method disclosed in Japanese Unexamined Patent Publication SHO 63-307837 (1988).

The optically active compound shows an antiferroelectric liquid crystal phase by itself, but requires a higher voltage for switching, so that the optically active compound when solely used is practically tortured by many problems. By the contrary, mixing of the optically active compound represented by the general formula (I) with the compound represented by the general formula (II) as used in the present invention enables the voltage required for switching to lower. The mixture may contain suitably 30 to 99 wt %, preferably 50 to 90 wt %, of the compound represented by the general formula (I), and 1 to 70 wt %, preferably 10 to 50 wt %, of that of the general formula (II). Also, any compound other than those represented by the formulae (I) and (II) may be added in the above mixture at a proper quantity. This additional compound does not necessarily require to show a liquid crystal phase and examples thereof include the following compounds:

(a) Compounds showing an antiferroelectric liquid crystal phase other than those represented by the general formula (I), (b) Compounds capable of adjusting the temperature range of liquid crystal phase of the liquid crystal composition to be prepared, (c) Optically active compounds which show or induce a large spontaneous polarization in an ferroelectric liquid crystal phase, (d) Optically active compounds capable of adjusting the spiral pitch of liquid crystal phase of the liquid crystal composition to be prepared.

As the compound (a), those represented by the aforesaid formulae (A), (B) and (C) may be employed. As the compounds (b), (c) and (d), the following compounds may be employed.

—COO—, —OCO—, —O—, —S—, —OCOO— or —CO—. $R_7$ and $R_8$ each represents an alkyl group with straight or branched chain having 1 to 15 carbon atoms which may contain an asymmetric carbon atom. s represents an integer of 1 or 2.

Furthermore, specific examples of the compound (c) may include the following compounds.

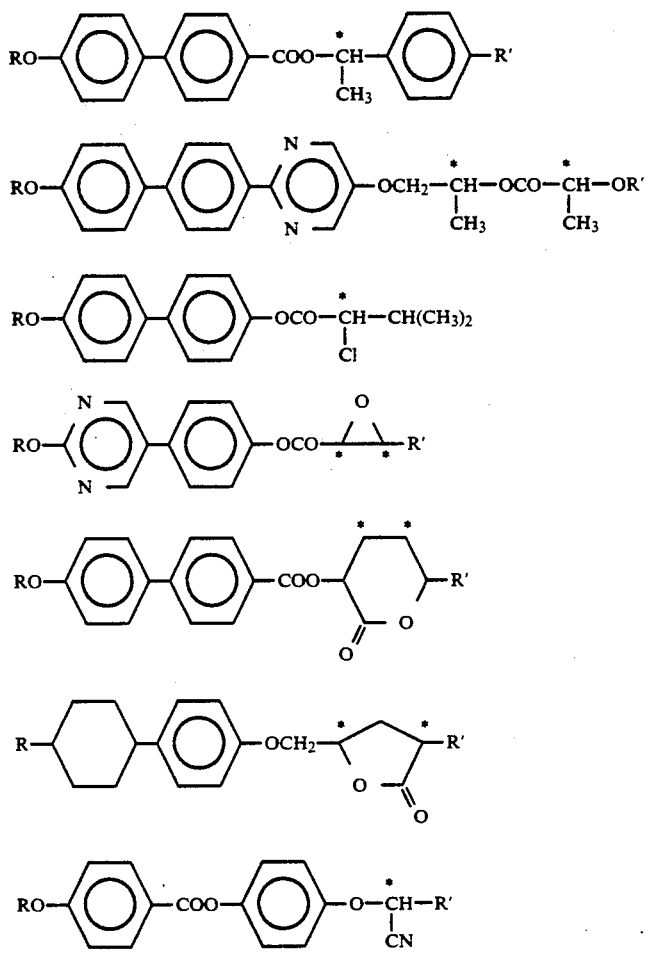

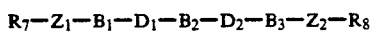

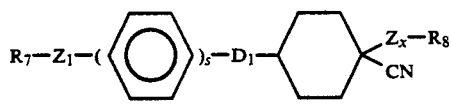

wherein $B_1$, $B_2$, and $B_3$ independently represent a six-membered cyclic ring such as benzen ring, cyclohexane ring, bicyclo [2.2.2]octane ring, pyridine ring, pyrimidine ring, pyrazine ring, dioxacyclohexane ring, and naphthalene ring, provided that the hydrogen atom in the ring may be substituted with a fluorine atom, a chlorine atom, a bromine atom, a cyano group, a nitro group, a methyl group, a methoxy group or the like. $D_1$ and $D_2$ each represents a single bond, or a group of —COO—, —OCO—, —CH=CH—, —C≡C—, —CH=CH—COO—, —OCO—CH=CH—, —CH$_2$CH$_2$—, —OCH$_2$—, —CH$_2$O—, —COS— or —SCO—. $Z_1$ and $Z_2$ each represents a single bond or a group of Next, an example of the antiferroelectric liquid crystal device of the present invention will be detailed.

FIG. 3 is a sectional view illustrating an example of the antiferroelectric liquid crystal device of the present invention using an antiferroelectric liquid crystal composition.

FIG. 3 shows an example of transmission type display device, wherein indicated at 1 is an insulating substrate; 2 is an conductive film; 3 is an insulating film; 4 is an orientation control layer; 5 is a sealant; 6 is an antiferroelectric liquid crystal composition; and 7 is a polarizer.

Photo-transmissive substrate is used for the insulating substrate 1, and generally glass substrate is employed therefor. The conductive film 2, which is usually composed of a conductive thin film of $InO_3$, $SnO_2$ or ITO (Indium-tin oxide), is used as a transparent electrode and is formed with a predetermined pattern on the insulating substrate 1.

On the substrate is formed an insulating film 3, but the film 3 may be omitted in some cases. As the insulating film 3, there may be used, for example, an inorganic thin film such as of $SiO_2$, $SiN_X$, $Al_2O_3$, etc., and an organic thin film such as of polyimide, photoresist resin, polymer liquid crystal, etc. In the case that the insulating film 3 is composed of an inorganic thin film, it may be formed by vacuum deposition process, sputtering process, CVD (Chemical Vapor Deposition) process or solution coating process. In the case that the insulating film 3 is composed of organic thin film, it may be formed by using a solution dissolving an organic substance or a solution of its precursor according to spin-coating process, immersion application process, screen printing process, roller application process and curing it at a predetermined conditions (heating, photo-irradiation, etc); the thin film may also be formed by LB(Langumuir-Blodgett) process as well as deposition process, sputtering process, CVD process.

On the insulating film 3 is formed an orientation control layer 4. In the case that the insulating film 3 is omitted, the orientation control layer 4 may be directly on the conductive film 2. As the orientation control layer, an inorganic layer may be used in some cases, while an organic layer may be also used in other cases.

In the case that an inorganic orientation control layer is used, slant deposition of silicone oxide is commonly conducted for the formation thereof. Rotating deposition may be also conducted. In the case that an organic orientation control layer is employed, nylon, polyvinylalcohol, polyimide and the like may be used. In this case, rubbing treatment is usually effected on the layer. The orientation control layer can also be formed by using a polymer liquid crystal or LB membrane with an intended orientation, by using magnetic field orientating technique or by using spacer edge method. Further, $SiO_2$, $SiN_X$ and the like may be formed by deposition process, sputtering process, CVD process and the like, on which rubbing treatment is effected for providing the orientation control layer.

Two insulating substrates are opposed together, and then an antiferroelectric liquid crystal composition 6 is injected therebetween to produce an antiferroelectric liquid crystal device over which the polarizer 7 is disposed.

Figure 4:
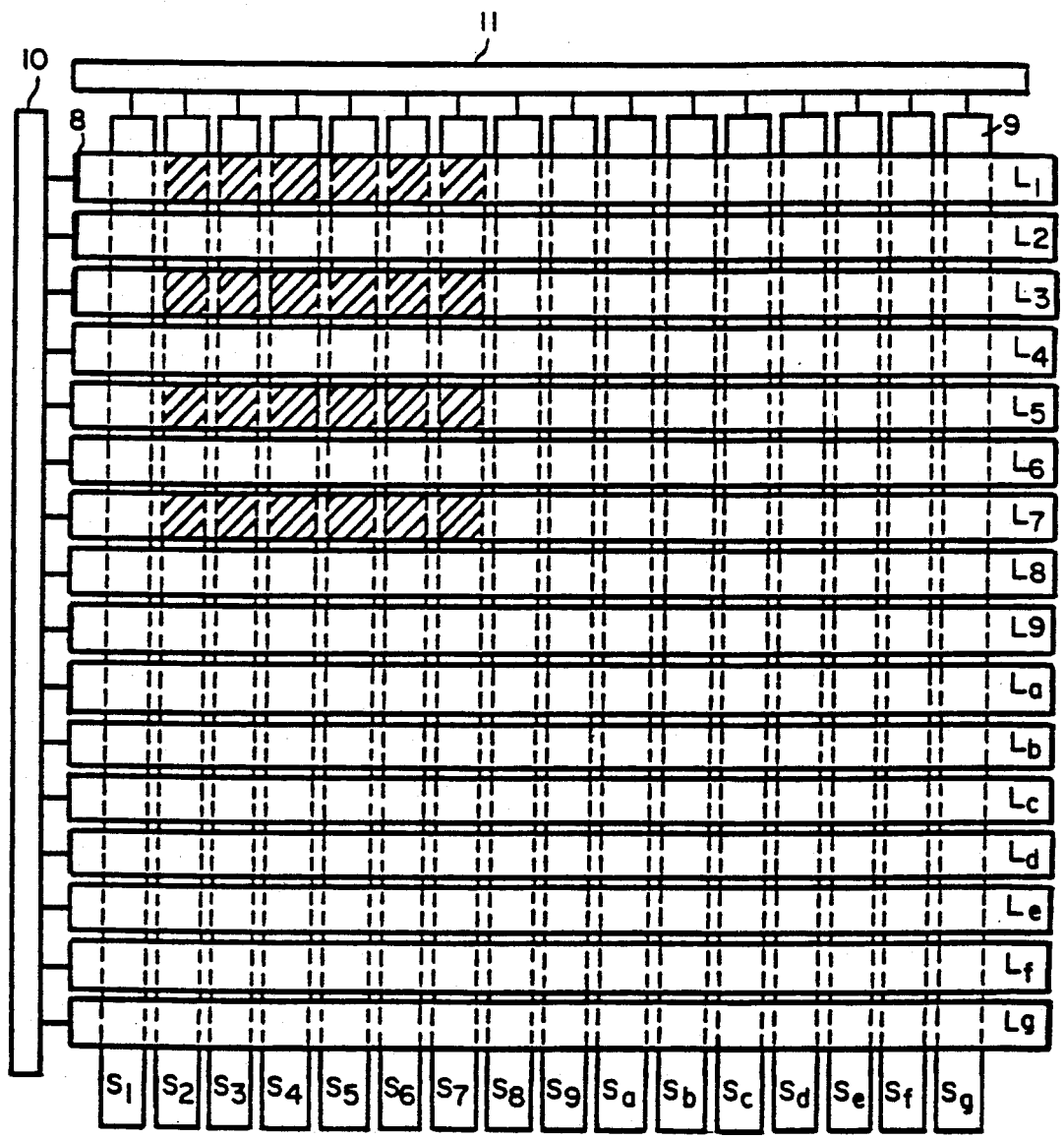
FIG. 4 is a schematic view showing an example a matrix type antiferroelectric liquid crystal device of the invention.

In FIG. 3, although the antiferroelectric liquid crystal device of the present invention is explained as a switching element with one pixel, the antiferroelectric liquid crystal of the present invention may be also applied to a matrix type display device with a large capacity wherein the wiring (electrodes) on the upper substrate together with those on the substrate are intersectionally placed as to provide a matrix type device structure, as is shown in a plan schematic view of FIG. 4. FIG. 4 shows an example of a simple matrix device comprising 16 scanning electrodes 8 and 16 signal electrodes 9. The scanning electrodes 8 are labeled as $L_1$, $L_2$, $L_3$, ... to $L_g$ from the uppermost one and the signal electrodes as $S_1$, $S_2$, $S_3$, ... to $S_g$ from the left side. The intersection of the scanning electrode $L_i$ and the signal electrode $S_j$ is represented as a pixel $A_{ij}$ (i and j are positive integers). The scanning electrodes 8 of the simple matrix device are connected with a scanning side driver 10, and the signal electrodes 9 are connected with a signal side driver 11.

Figure 5:
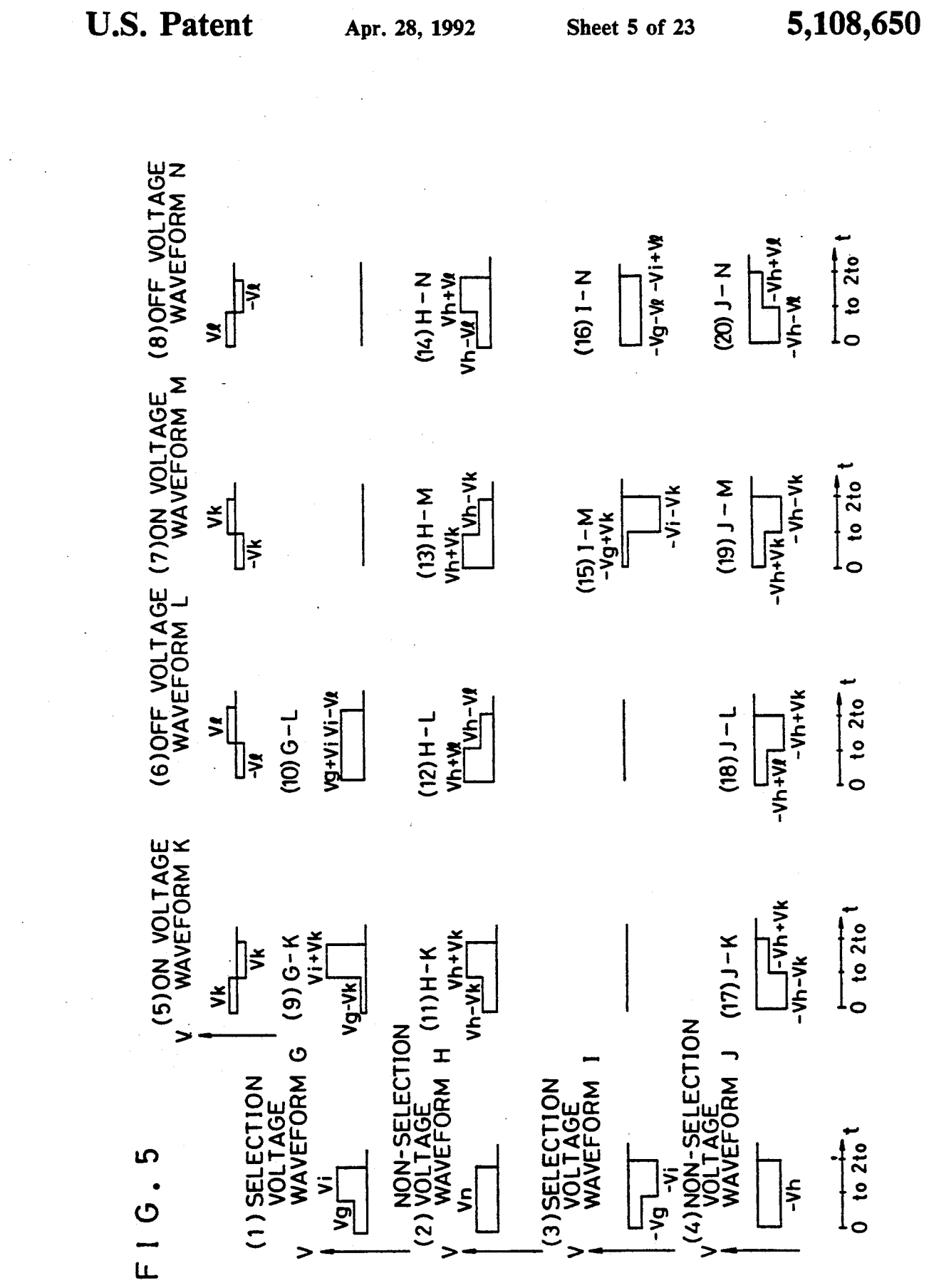
Figure 6:
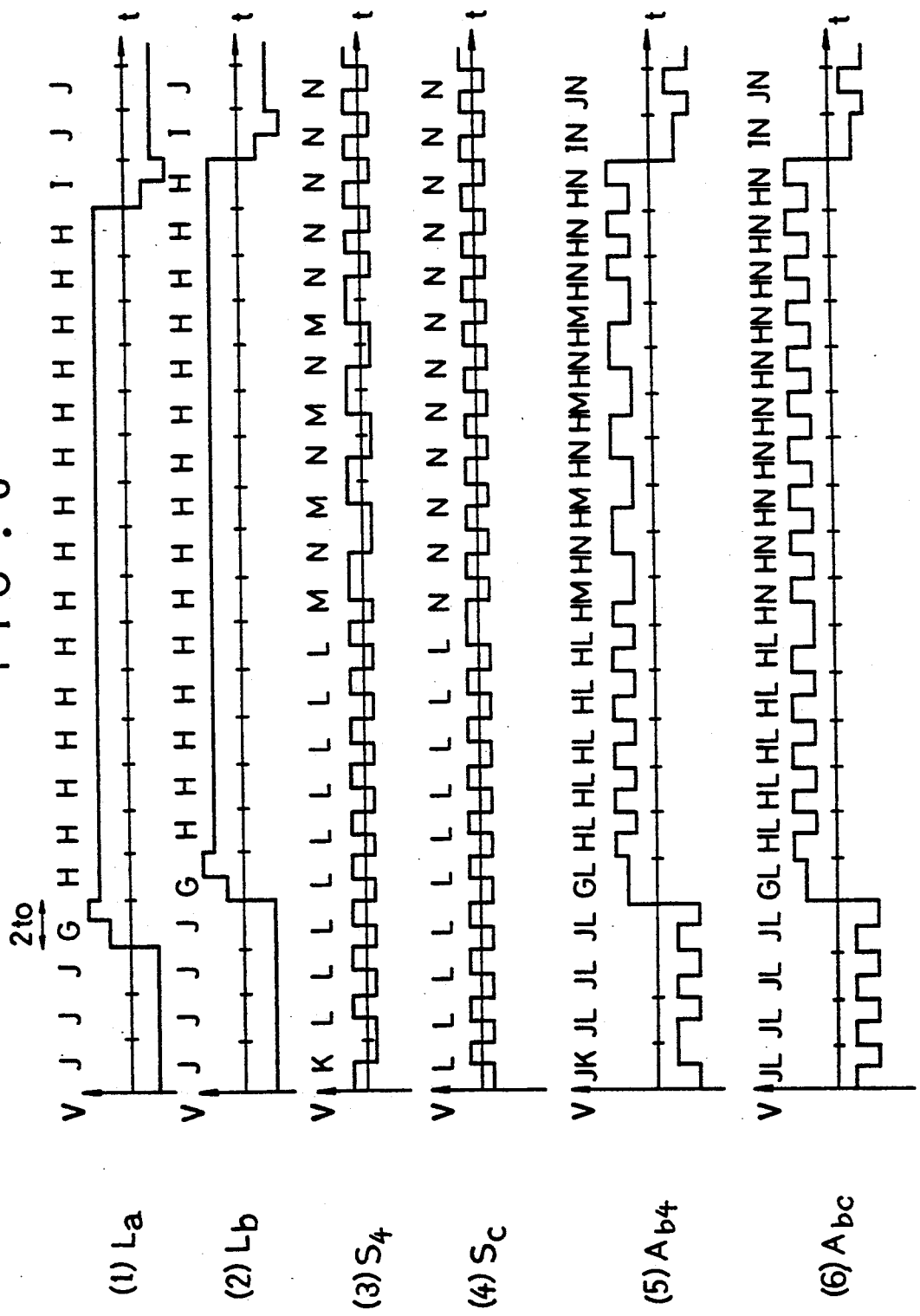
Figure 7:
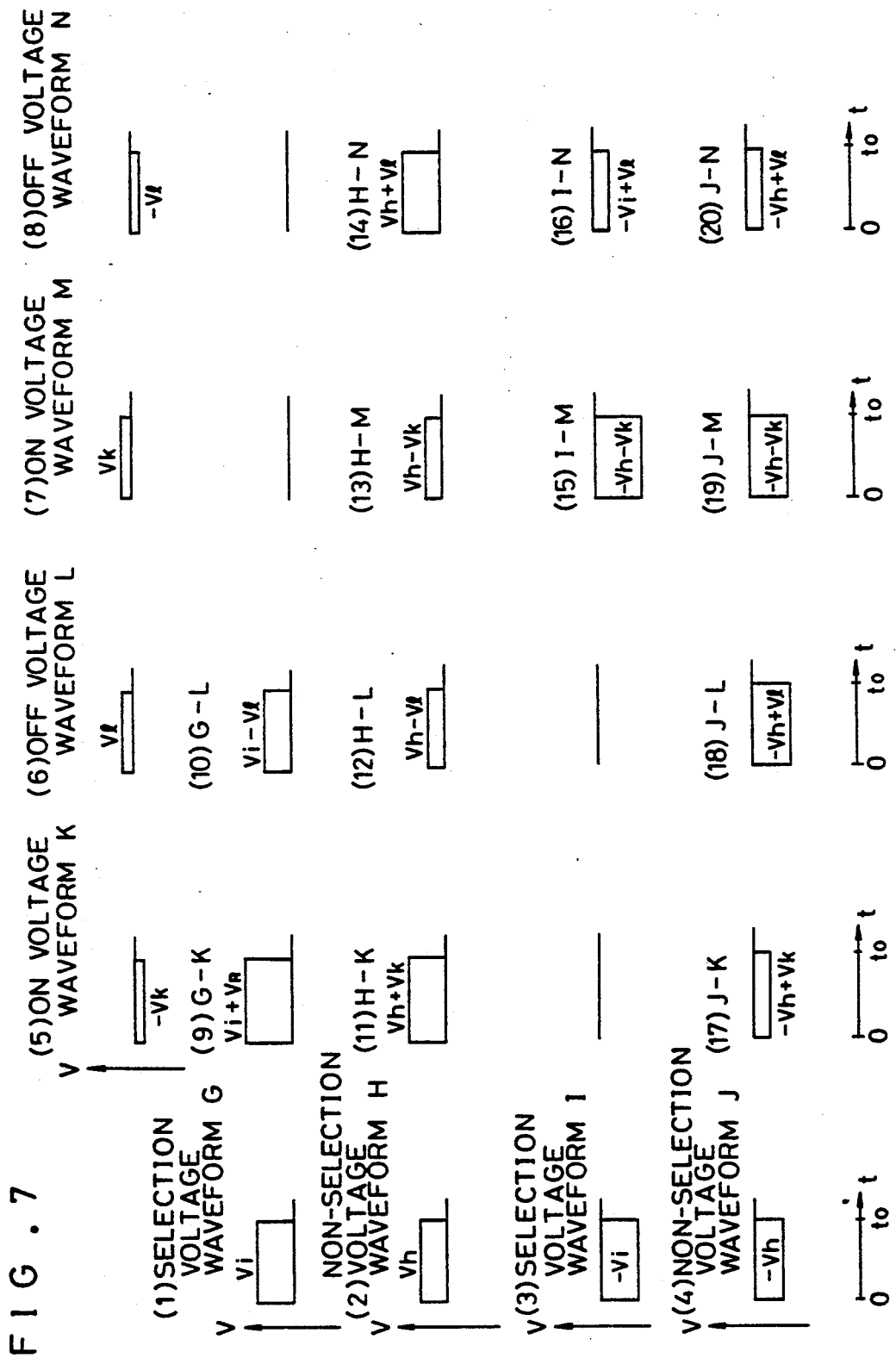

Such a matrix-type liquid crystal device may be driven by the drive waveforms and the driving method as shown in FIGS. 5 and 6. Specifically, at odd-numbered frames, a selection voltage waveform G shown in 1 of FIG. 5 is sequentially applied to $L_1$ through $L_g$ of the scanning electrodes 8, and at even-numbered frames the selection voltage waveform I shown in 3 of FIG. 5 is sequentially applied to $L_1$ through $L_g$ of the same. After application of the selection voltage waveform G of 1 to $L_i$ of the scanning electrode 8, non-selection voltage waveform H of 2 in FIG. 5 is applied to $L_i$ of the scanning electrodes 8 the same frame. While, after application of selection voltage waveform I of 3 of FIG. 5 to $L_i$ of the scanning electrodes 8 non-selection voltage waveform J of 4 of FIG. 5 is applied to $L_i$ of the scanning electrodes 8 in the same frame. When it is desired that a pixel $A_{ij}$ in an odd-numbered frame is set in the state 1 shown in FIG. 2, ON voltage waveform of 5 in FIG. 5 is to be applied to $S_j$ of the signal electrodes 9. Also, when it is desired to set the pixel $A_{ij}$ in the state 2 in FIG. 2, OFF voltage waveform of 6 is to be applied to $S_j$ of the signal electrode 9. In an even-numbered frame, when it is desired to set the pixel $A_{ij}$ in the state 3 shown in FIG. 2, ON voltage waveform of 7 in FIG. 5 is to be applied to $S_j$ of the signal electrode 9. Also, when it is desired to set the pixel $A_{ij}$ in the state 2 in FIG. 2, OFF voltage waveform of 8 is to be applied to $S_j$ of the signal electrode 9. (In this case, the polarization axis of the polarizing plate is made to match with a direction perpendicular to the smectic layer of in the state 2 of FIG. 2). Voltage waveforms applied to the scanning electrodes $L_a$, $L_b$, the signal electrodes $S_4$, $S_c$, and pixels $A_{b4}$, $A_{bc}$ when the pattern of FIG. 4 is displayed by the above manner is shown in FIG. 6. Although the voltage waveforms applied to the pixels are different from each other at 5 and 6 in FIG. 6, the antiferroelectric liquid crystal makes response corresponding to applied voltage but substantially not to application time of voltage, so that there appears no crosstalk. A driving waveform shown in FIG. 7 may be alternatively used instead of that of FIG. 5.

EXAMPLES

Example 1

By using the compounds Nos. 11, 21 and 22 as shown in Table 1, the liquid crystal compositions Nos. 31 and 32 as shown in Table 2 were prepared.

TABLE 1

Compound No. 10

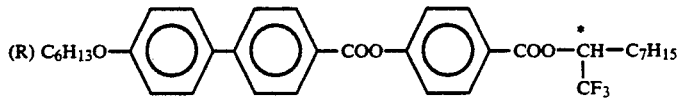

Compound No. 11

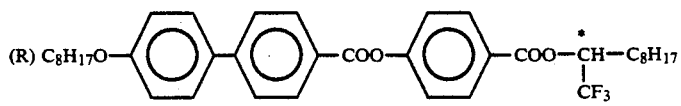

TABLE 1-continued

Compound No. 12
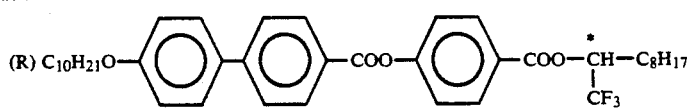

Compound No. 13
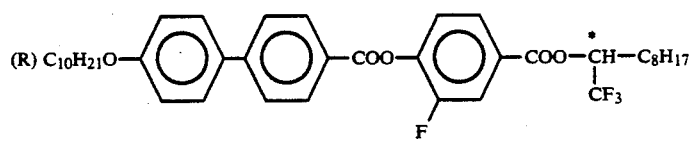

Compound No. 14
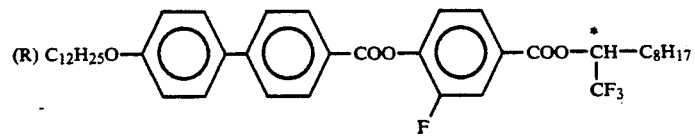

Compound No. 21
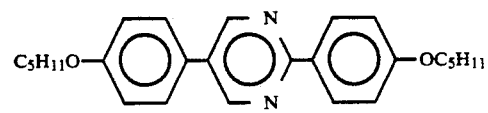

Compound No. 22
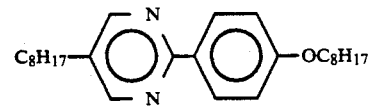

Compound No. 23
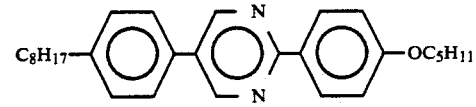

Compound No. 24
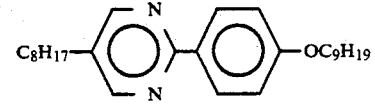

Compound No. 25
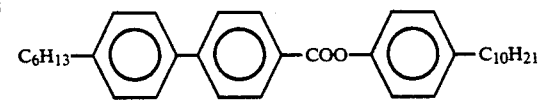

Compound No. 26
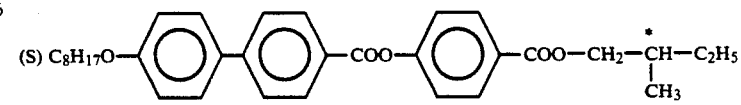

Compound No. 27
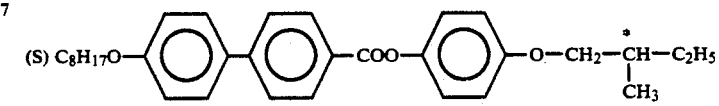

TABLE 2

| | | (wt. %) |
|---|---|---|
| Composition No. 31 | Compound No. 11 | 94.0% |
| | Compound No. 21 | 6.0% |
| Composition No. 32 | Compound No. 11 | 87.9% |
| | Compound No. 21 | 5.4% |
| | Compound No. 22 | 6.7% |

Figure 8:
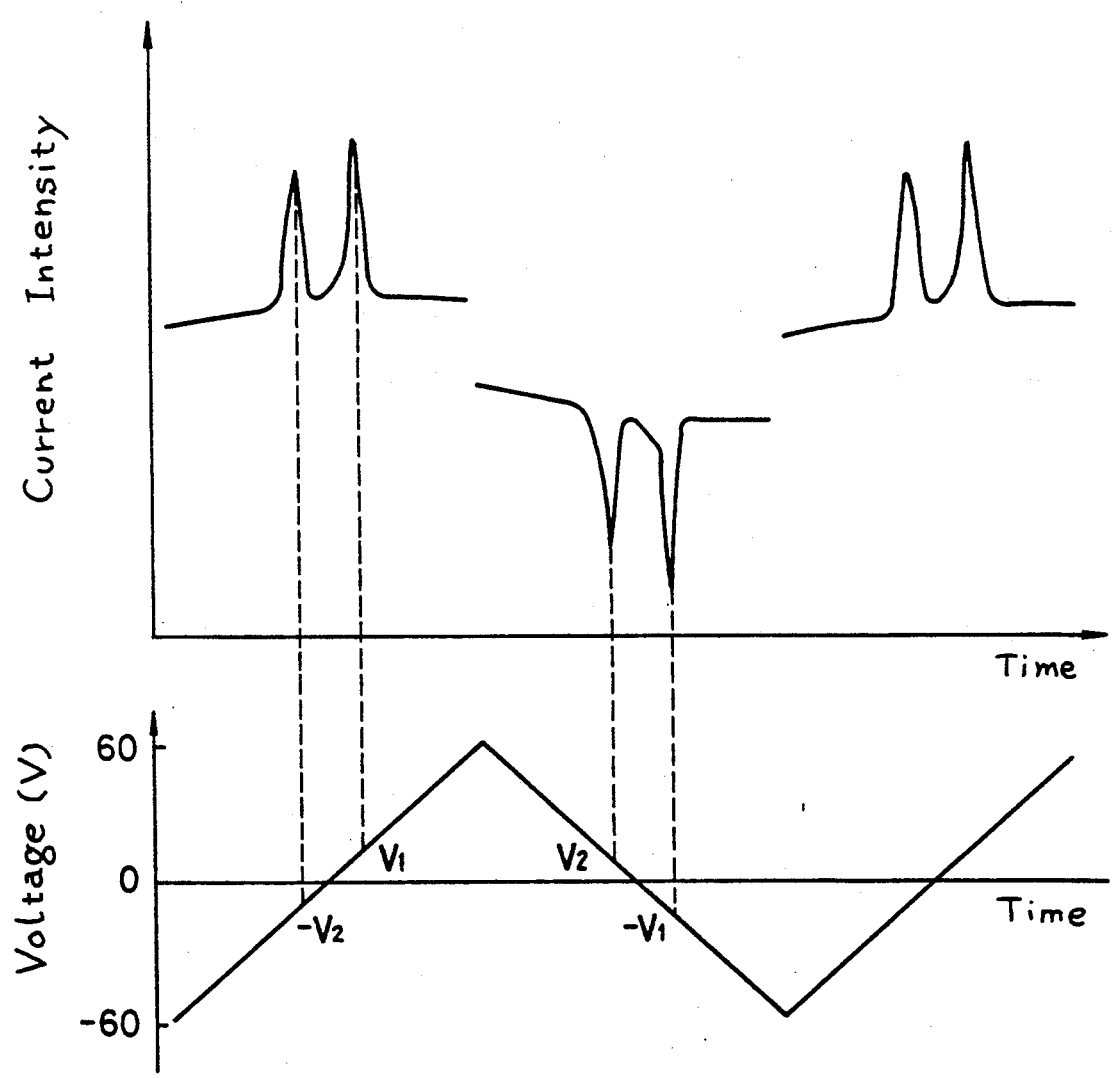
FIG. 8 is a graph illustrating the polarization inverting current to be detected when a triangular wave voltage is applied to the antiferroelectric liquid crystal device of the present invention.

Then, a polyimide film was formed on each of the two glass substrates provided with ITO films. Rubbing treatment was effected on one of the substrates. The two substrates were oppositely placed to each other to provide a liquid crystal cell with a cell thickness of 3 μm. The liquid crystal compositions Nos. 31 and 32 were each injected in the liquid crystal cell which was then heated first to temperature that the liquid crystal composition changes to an isotropic liquid, and thereafter cooled to room temperature at a ratio of 1° C./min to obtain an antiferroelectric liquid crystal device of the invention. A triangular waveform voltage of 1 Hz was applied to the antiferroelectric liquid crystal device to measure two polarization inverted current as shown in FIG. 8. At the same time, the intensity of photo transmittance was measured under cross-nicol to obtain doubled hysteresis curve as shown in FIG. 2 from which the threshold voltages $V_1$ and $V_2$ were calculated and plotted to the measured temperature to obtain the result shown in FIGS. 9 and 10. In this case, the absolute values of the two voltages $V_1$ and $V_2$ mean switching voltages necessary for developing the states 1 and 2 of the liquid crystal phase as shown in FIG. 1. The phase transition temperature of the antiferroelectric liquid crystal compositions Nos 31 and 32 are shown in Table 3.

TABLE 3

| Liquid Crystal | Phase Transition Temperature (°C.) | | | |
| --- | --- | --- | --- | --- |
| Materials | C | $S_{CA}*$ | $S_A$ | I |
| Compound No. 11 | • 84 | • 103 | • 114 | • |
| Composition No. 31 | • 57 | • 95 | • 134 | • |
| Composition No. 32 | • 64 | • 75 | • 130 | • |

C: Crystal phase
$S_{CA}*$: Antiferroelectric liquid crystal phase
$S_A$: Smectic A phase
I: Isotropic liquid phase

Comparison Example

Figure 9:
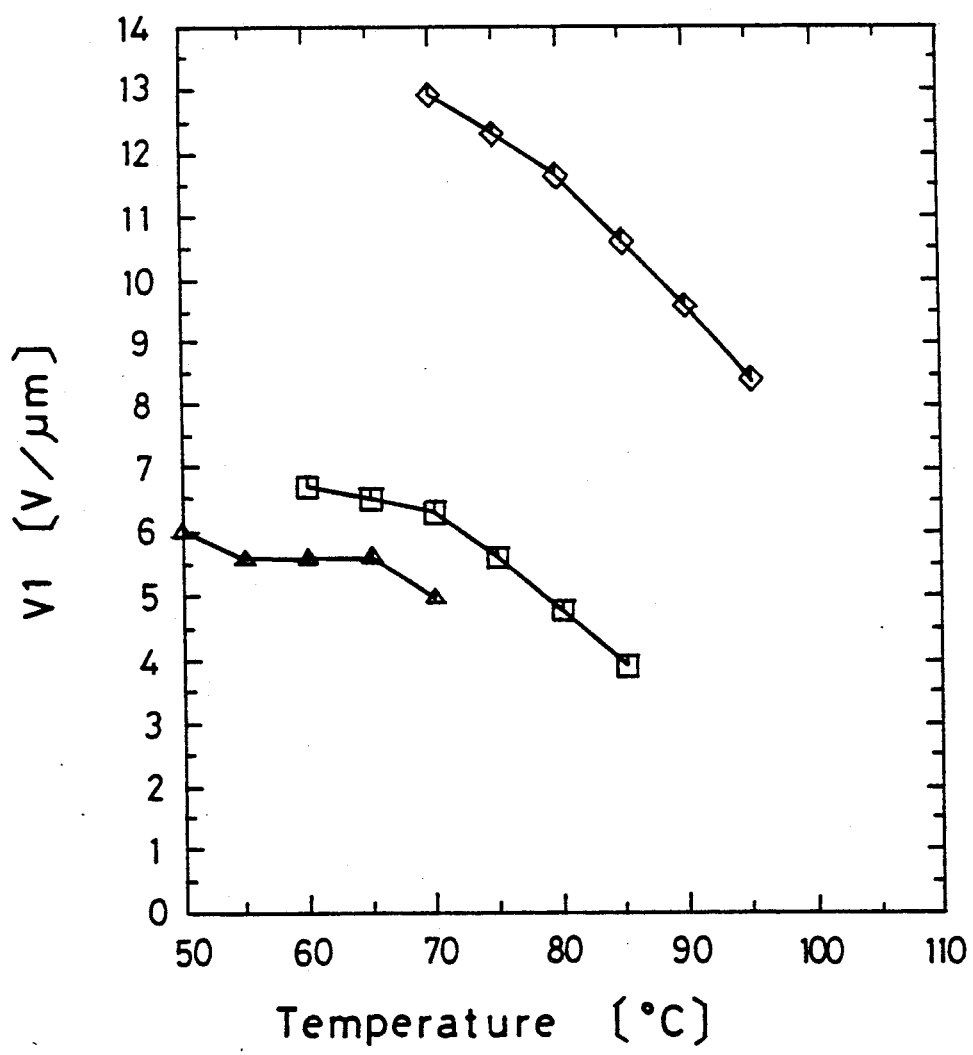
FIGS. 9 and 10 are graphs each illustrating the relation of switching voltage and temperature of the antiferroelectric liquid crystal device of the present invention.
Figure 10:
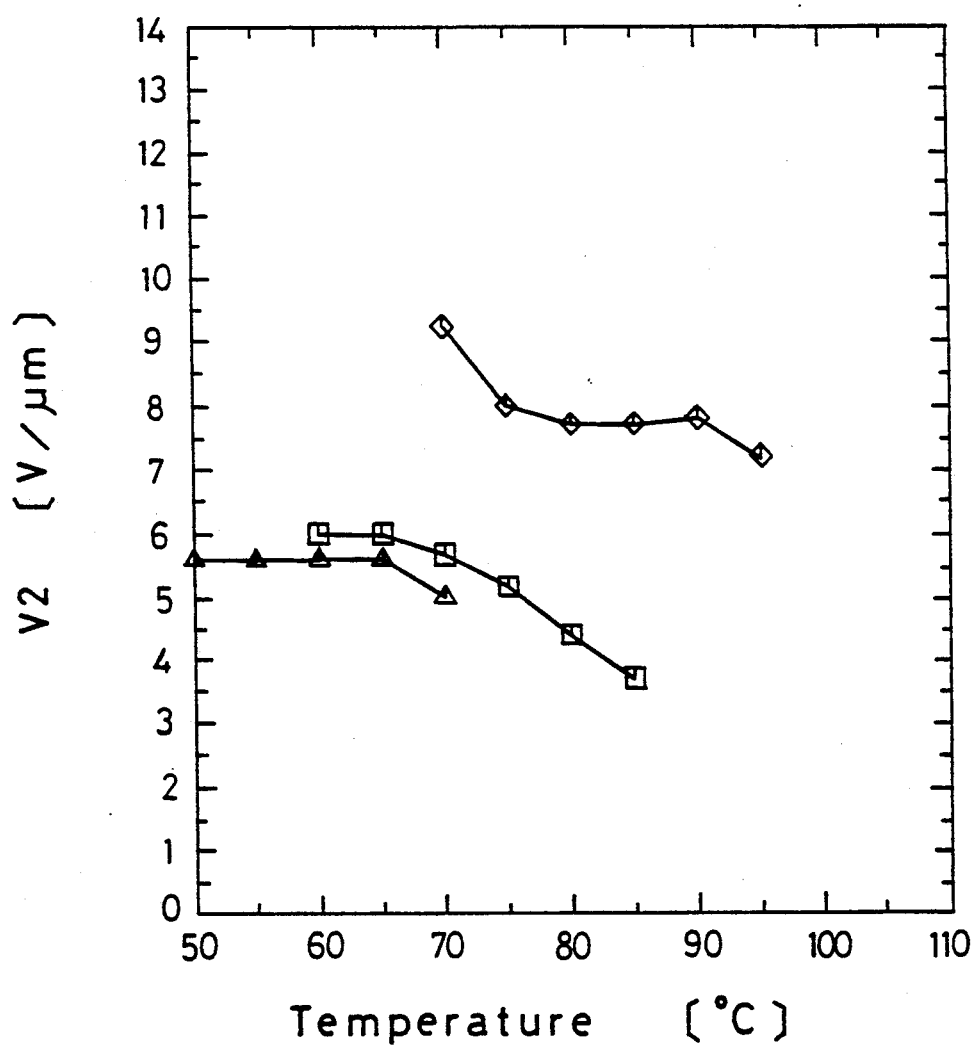
Figure 11:
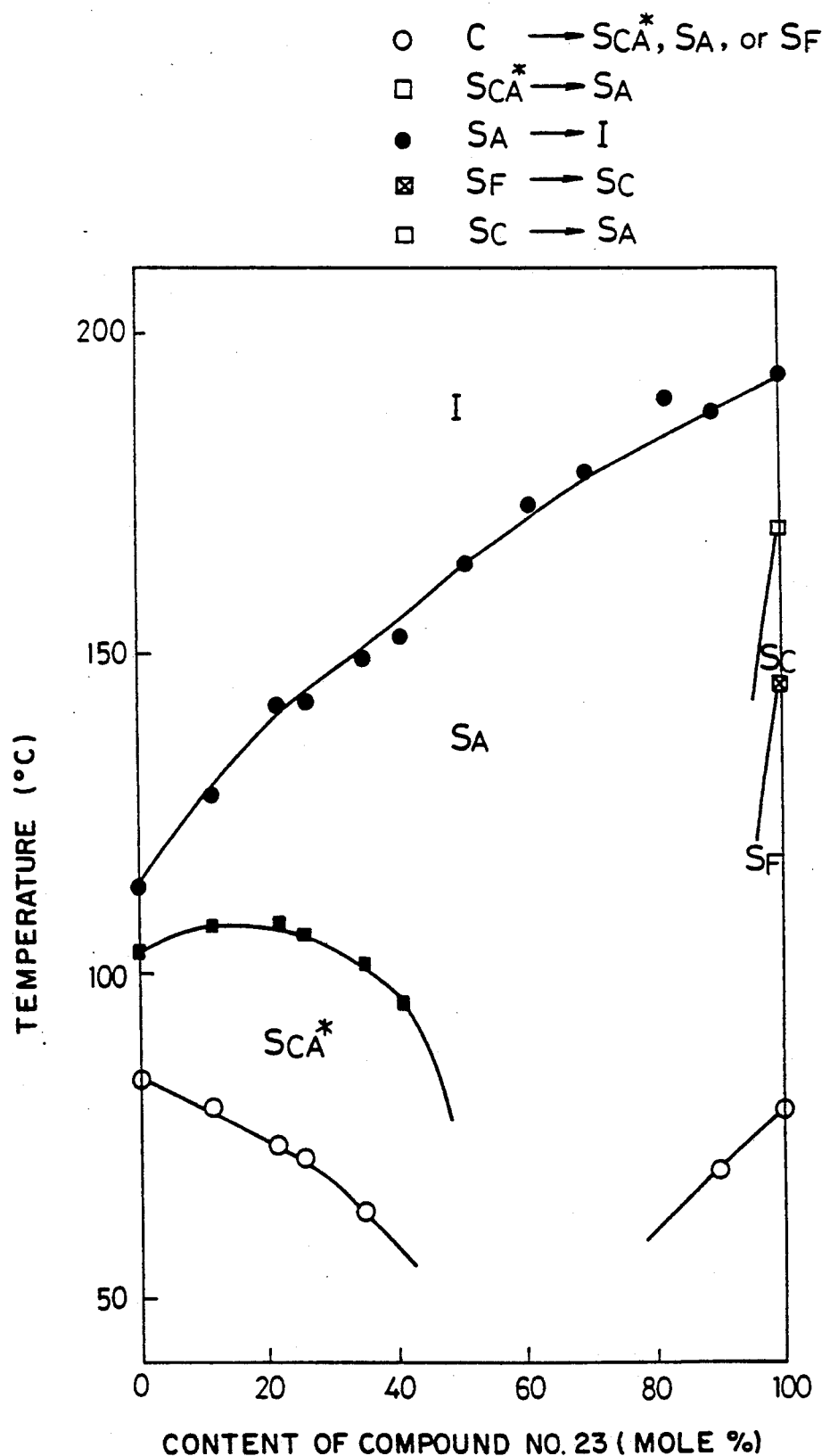
FIG. 11 is a graph showing the two-system phase diagram in relation to the mixture of the compound showing an antiferroelectric liquid crystal phase and those not showing the same.

A liquid crystal device was fabricated in a similar manner to the first example excepting that the compound No.11 was simply used instead of the composition No.31 or 32, and the measurement was effected as similar manner to the first example. The plots of $V_1$ and $V_2$ to the measured temperature are shown in FIGS. 9 and 10. The phase transition temperature of the antiferroelectric liquid crystal compound No. 11 is also shown in Table 3. Comparing the first example of the present invention with the comparison example reveals that the device of the present invention realizes a lower voltage switching.

Example 2

The compositions Nos. 41 to 50 comprise the two constituents, the compounds Nos. 11 and 23, were prepared. The contents thereof are shown in Table 4.

TABLE 4

| | Composition (mol. %) | |
| --- | --- | --- |
| Compositions | Compound No. 11 | Compound No. 23 |
| Composition No. 41 | 88.7 | 11.3 |
| Composition No. 42 | 79.3 | 20.7 |
| Composition No. 43 | 75.4 | 24.6 |
| Composition No. 44 | 66.5 | 33.5 |
| Composition No. 45 | 60.1 | 39.9 |
| Composition No. 46 | 50.3 | 49.7 |
| Composition No. 47 | 40.0 | 60.0 |
| Composition No. 48 | 30.7 | 69.3 |
| Composition No. 49 | 18.2 | 81.8 |
| Composition No. 50 | 10.8 | 89.2 |

Figure 12:
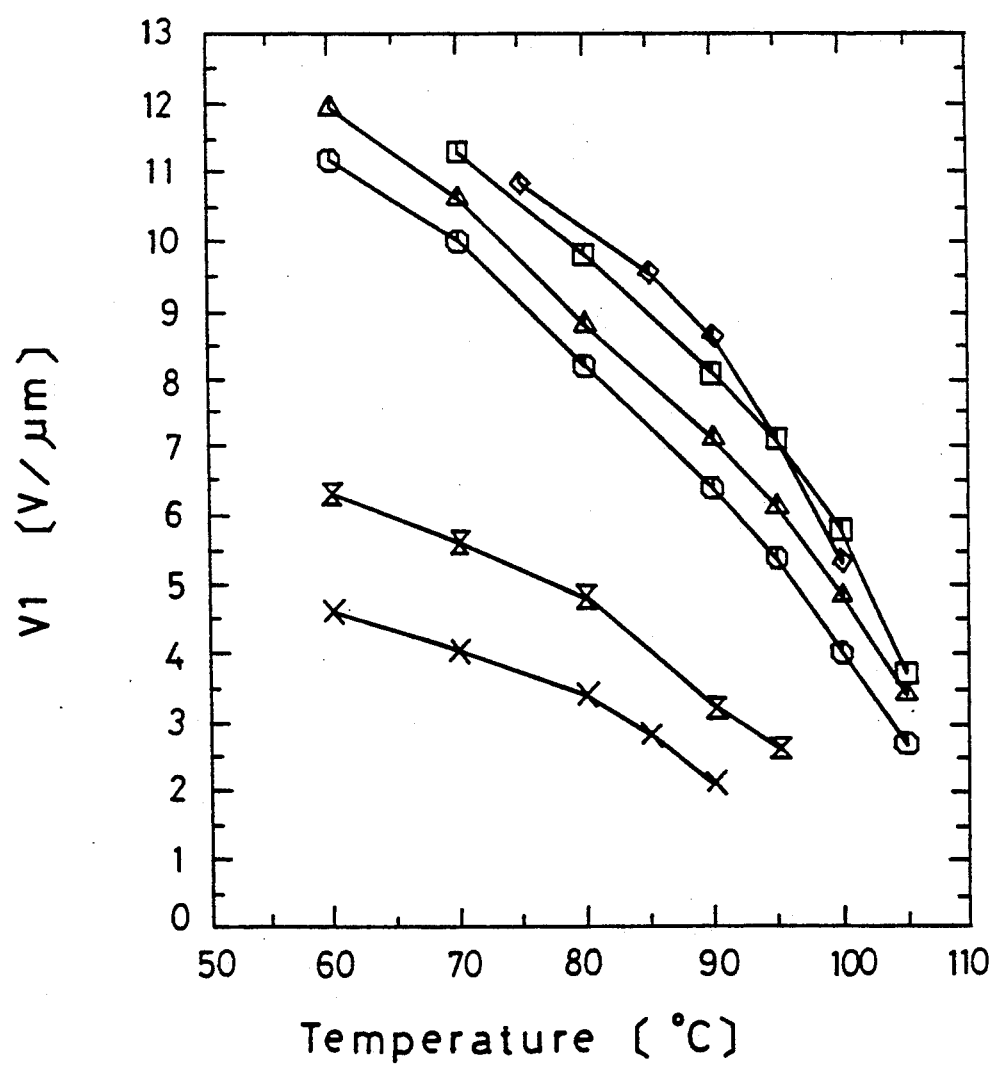
FIGS. 12 and 13 are graphs each illustrating the relation of switching voltage and temperature in the antiferroelectric liquid crystal device of the present invention.
Figure 13:
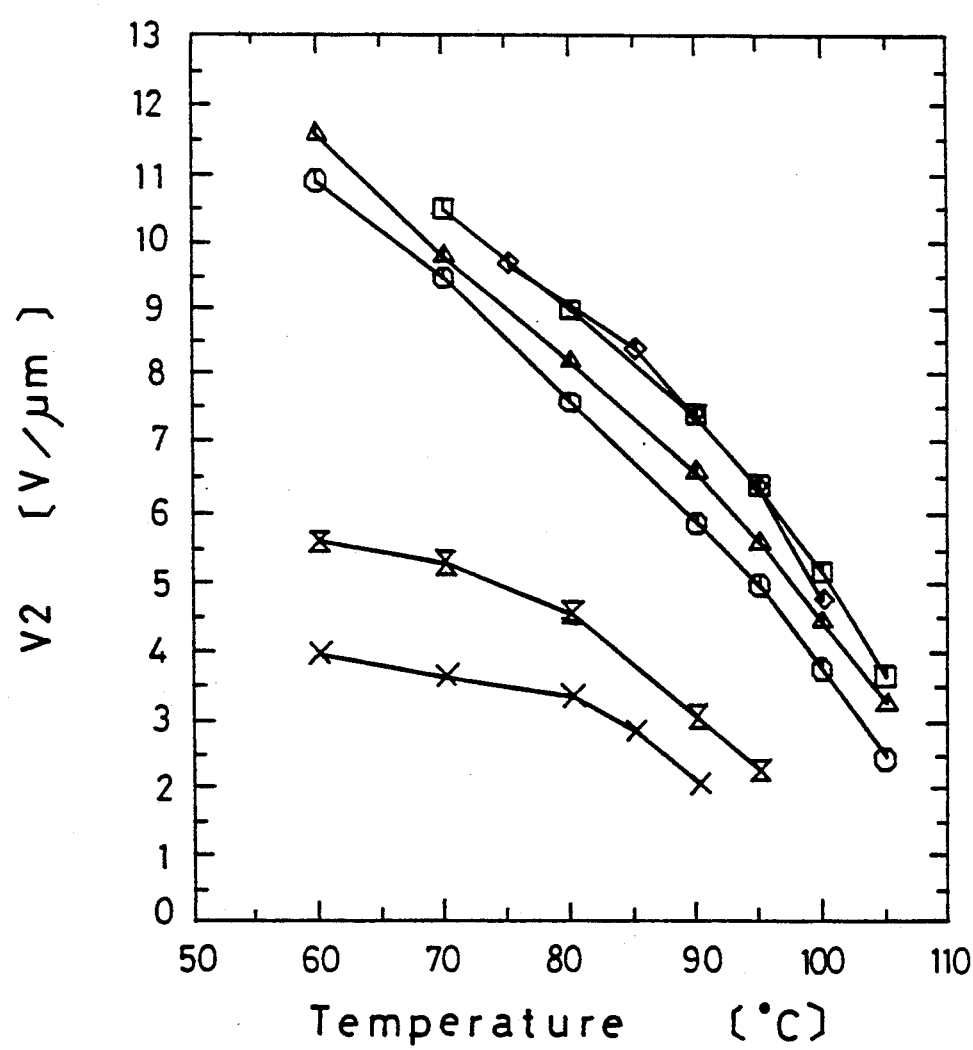
Figure 14:
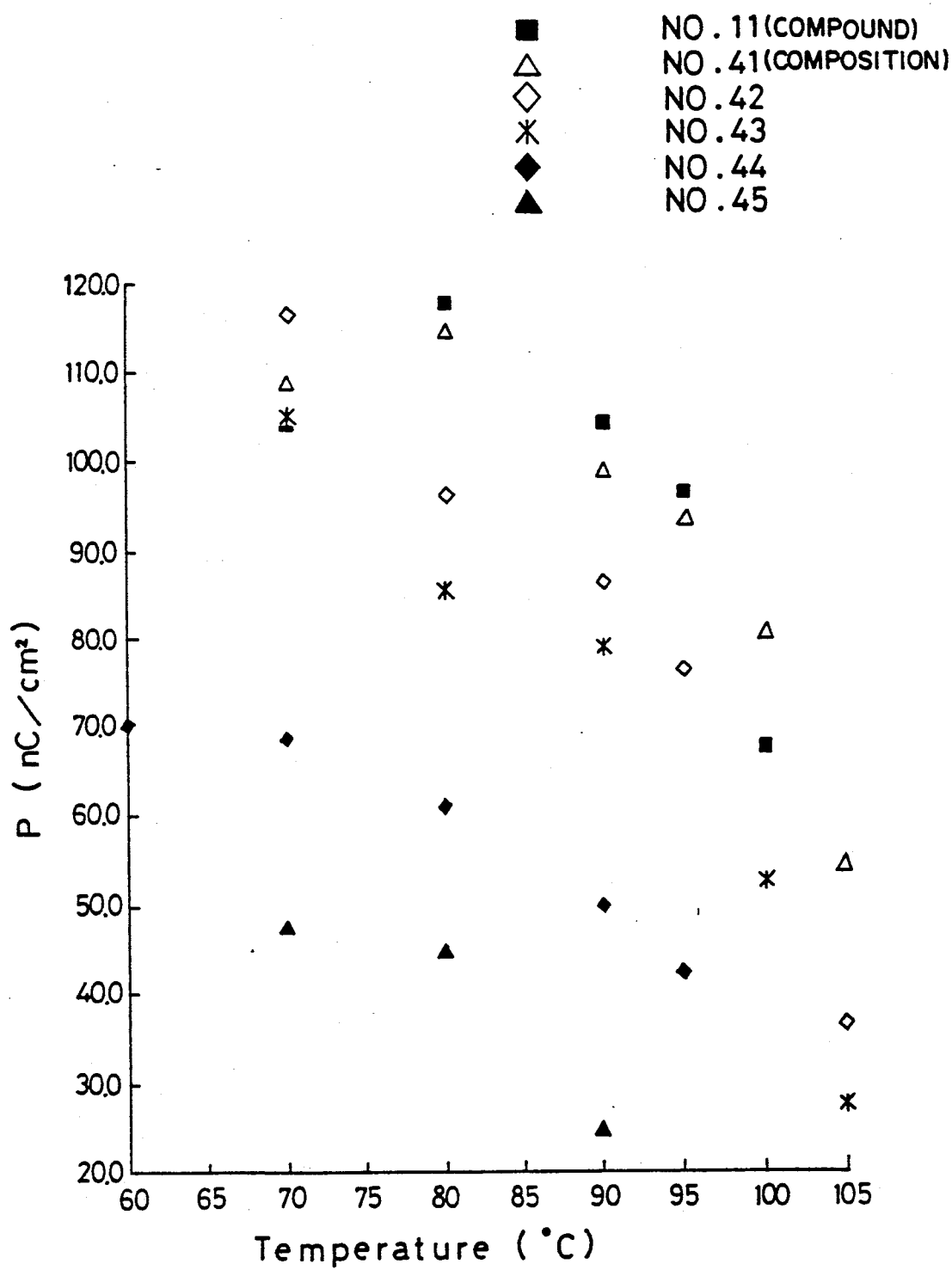
FIG. 14 is a graph illustrating a spontaneous polarization of an antiferroelectric liquid crystal composition used in the embodiment, of the present invention.

A polyimide film was formed on each of the two glass substrates provided with ITO films. Rubbing treatment was effected on both of the substrates. The two substrates were opposedly placed to each other to provide a liquid crystal cell with a cell thickness of 5 μm. The liquid crystal compositions Nos. 41 to 50 were each injected in the liquid crystal cells which were then heated first to the temperature that the liquid crystal composition changes to an isotropic liquid, and thereafter cooled to room temperature at a ratio of 1° C./min to obtain an antiferroelectric liquid crystal device of the invention. A triangular waveform voltage of 0.02 Hz was applied to the antiferroelectric liquid crystal device to measure two polarization inverted current as shown in FIG. 8. At the same time, the intensity of photo-transmittance was measured under cross-nicol to obtain doubled hysteresis curve as shown in FIG. 2 from which threshold voltages $V_1$ and $V_2$ were calculated and plotted to the measured temperature to obtain the graphs as shown in FIGS. 12 and 13. Values of spontaneous polarization obtainable from the polarization inverted current curve are also shown in FIG. 14.

As shown by this example, the use of the compound No. 23 enables the field strength necessary for switching to lower.

EXAMPLE 3

The compositions Nos. 43 and 51 to 54 were prepared by adding 25 mole % of a compound not showing an antiferroelectric liquid crystal phase to the compound No. 11 showing an antiferroelectric liquid crystal phase. The compounds added and their phase transition temperature are as shown in Table 5.

TABLE 5

Phase transition temperature of the compositions in which 25 mole % of specific compounds is added in compound No. 11

| | | Phase Transition temperature (°C.) | | |
| --- | --- | --- | --- | --- |
| Compositions | Added compounds | $S_{CA}*$ | $S_A$ | I |
| Composition No. 43 | Compound No. 23 | • 106 | • 142 | • |
| Composition No. 51 | Compound No. 24 | • 89 | • 111 | • |
| Composition No. 52 | Compound No. 25 | • 107 | • 139 | • |
| Composition No. 53 | Compound No. 26 | • 113 | • 136 | • |
| Composition No. 54 | Compound No. 27 | • 110 | • 142 | • |

Figure 15:
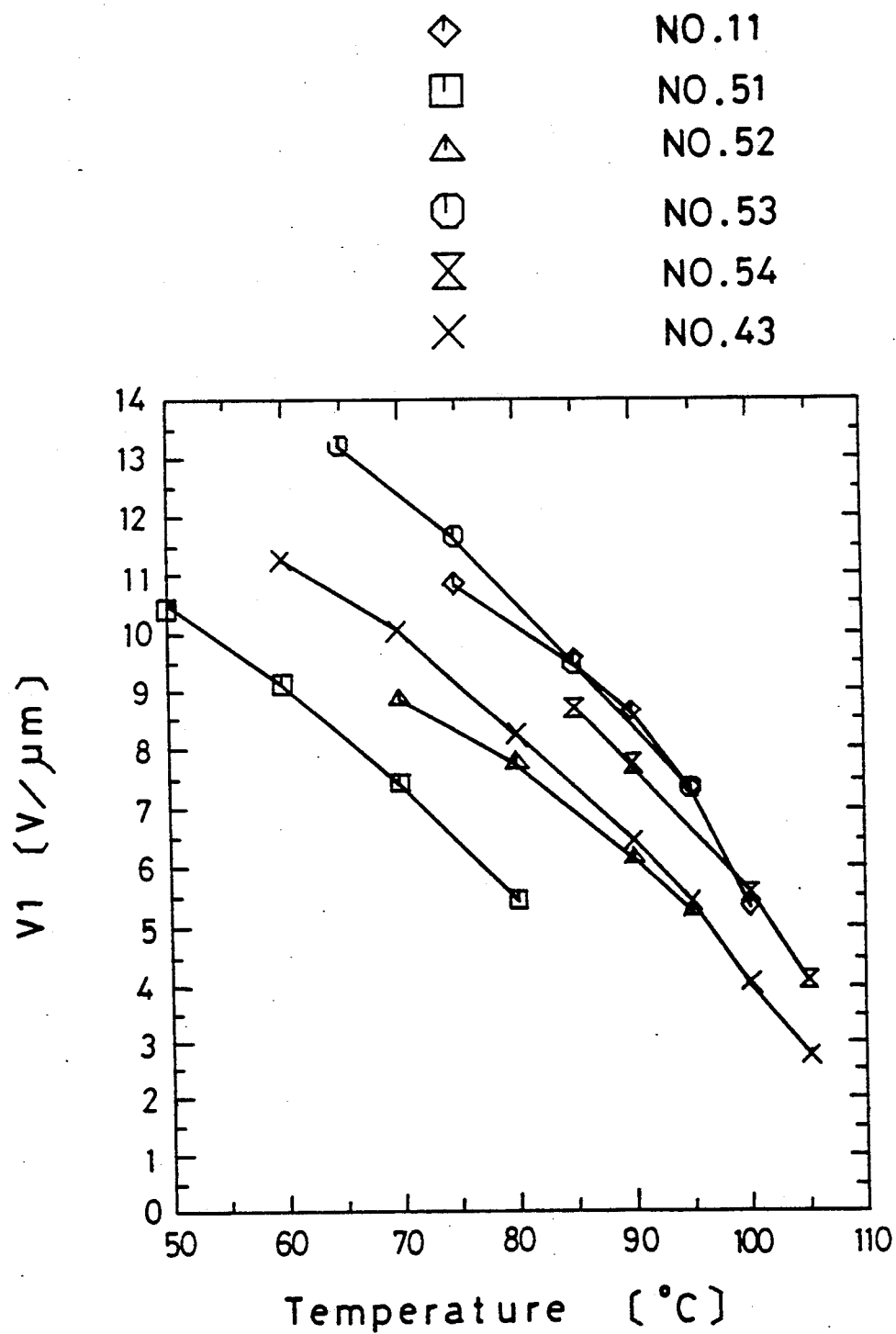
FIGS. 15 and 16 are graphs each illustrating the relation of switching voltage and temperature in the antiferroelectric liquid crystal device of the present invention.
Figure 16:
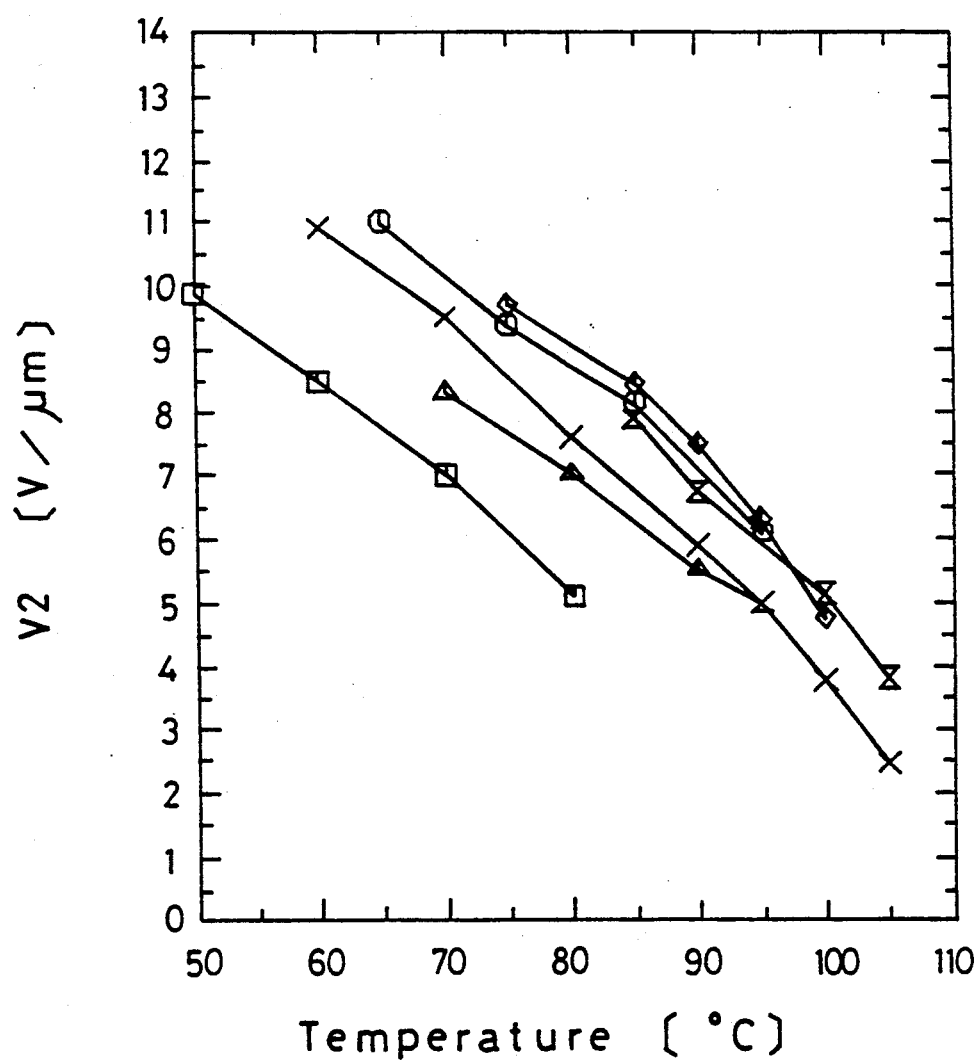
Figure 17:
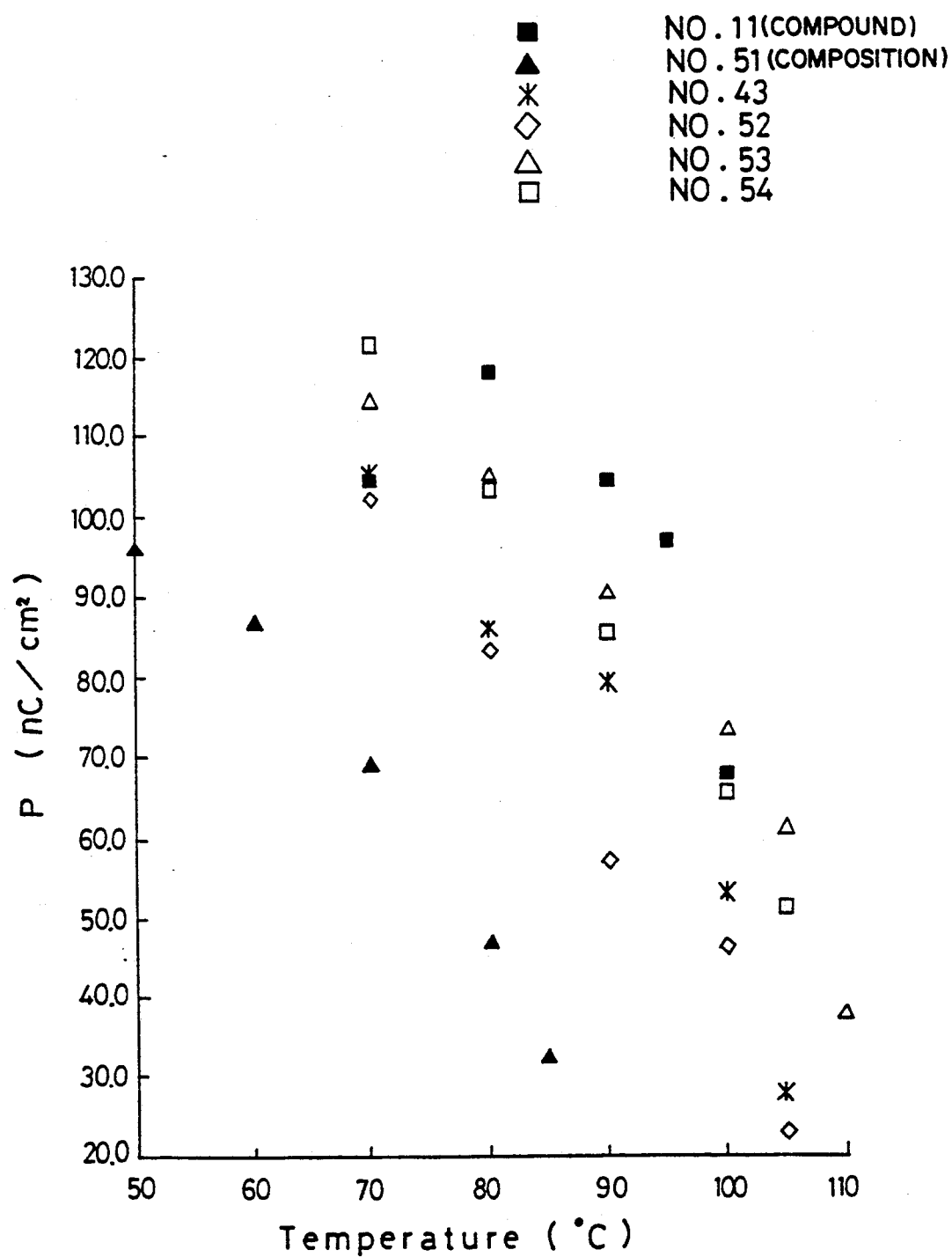
FIGS. 17 is a diagram illustrating a spontaneous polarization of an antiferroelectric liquid crystal composition of used in the embodiment of the present invention.

Similarly to the Example 2, the voltages $V_1$ and $V_2$ and the spontaneous polarization were plotted with respect to the measured temperature (FIGS. 15 to 17).

As seen in FIG. 15, the field strength (voltage) necessary for switching was lowered by the addition of a compound that does not show an antiferroelectric liquid crystal phase.

Example 4

The compositions as shown in Table 6 were prepared. Their phase transition temperature is shown in Table 6 in which also shown is the phase transition temperature of the compound No. 13.

TABLE 6

| | | Phase Transition temperature (°C.) | | |
| --- | --- | --- | --- | --- |
| Compositions | Content | $S_{CA}*$ | $S_A$ | I |
| Composition No. 55 | Compound No. 11 (50 mole %) Compound No. 27 (50 mole %) | • 93 | • 166 | • |
| Compound No. 13 | | • 64 | • 83 | • |
| Composition No. 56 | Compound No. 13 (75 mole %) Compound No. 23 (25 mole %) | • 70 | • 113 | • |

Figure 18:
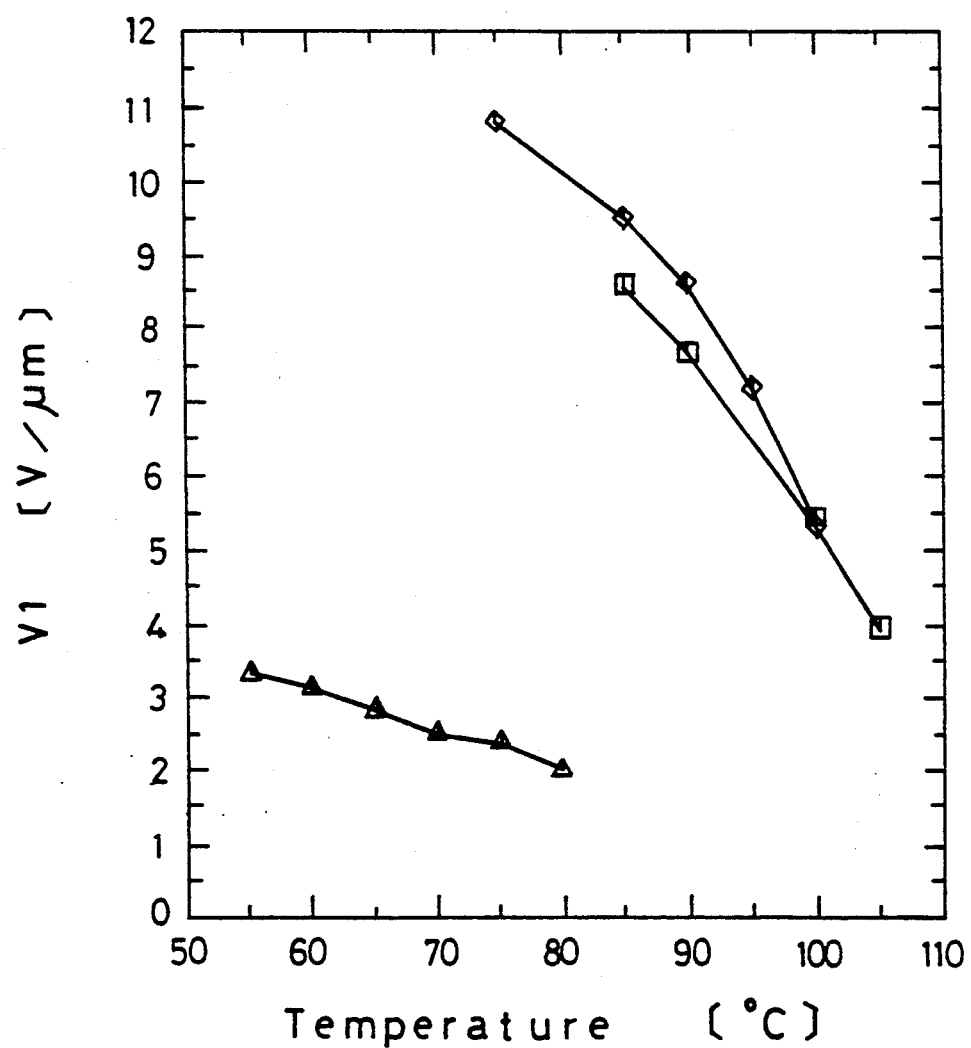
FIGS. 18 and 19 are graphs each illustrating the relation of switching voltage and temperature in the antiferroelectric liquid crystal device of the present invention.
Figure 19:
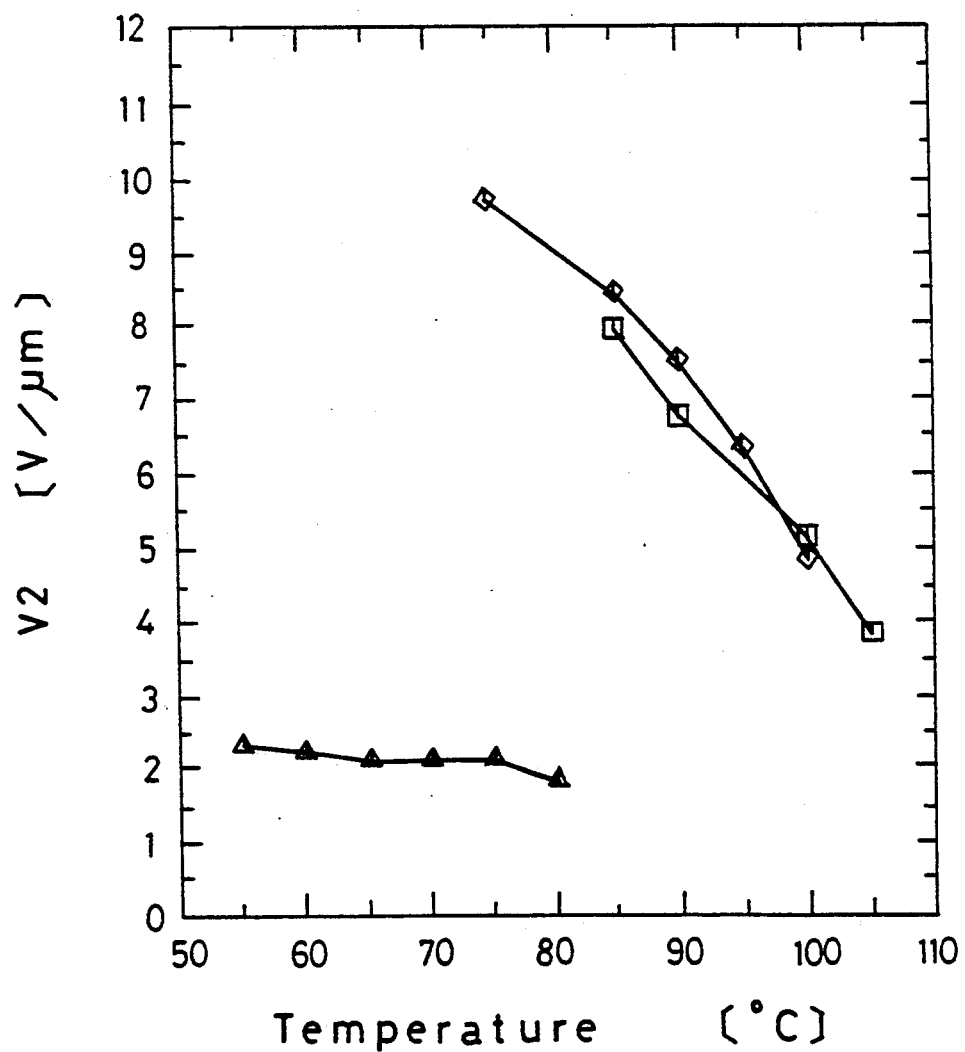
Figure 20:
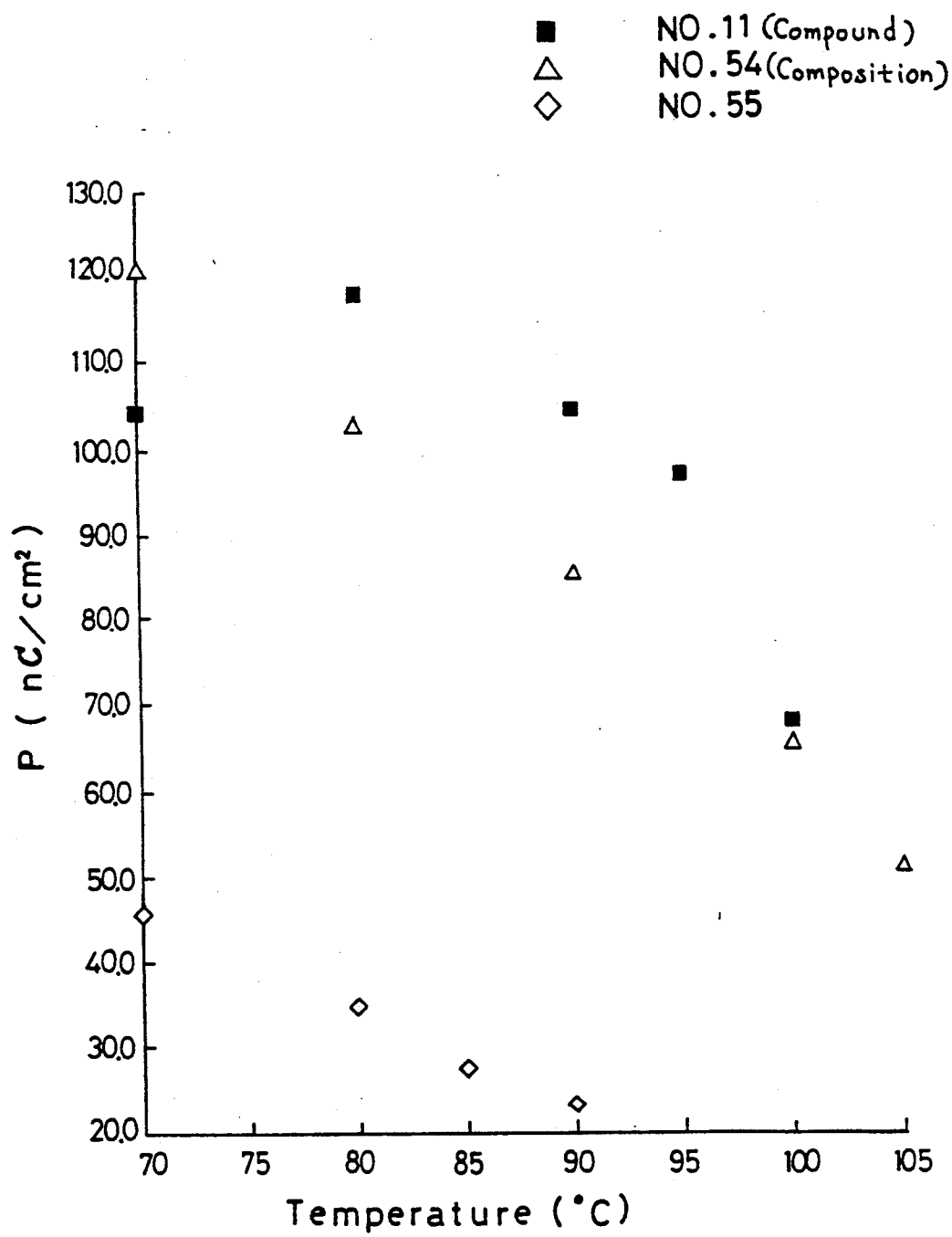
FIGS. 20 is a graph illustrating a spontaneous polarization of an antiferroelectric liquid crystal composition used in the embodiment of the present invention.

Similarly to the Example 2, the voltages $V_1$ and $V_2$ and the spontaneous polarization were measured. The data of the compound No. 11 and the composition Nos. 54 and 55 are plotted in FIGS. 18 to 20.

Figure 21:
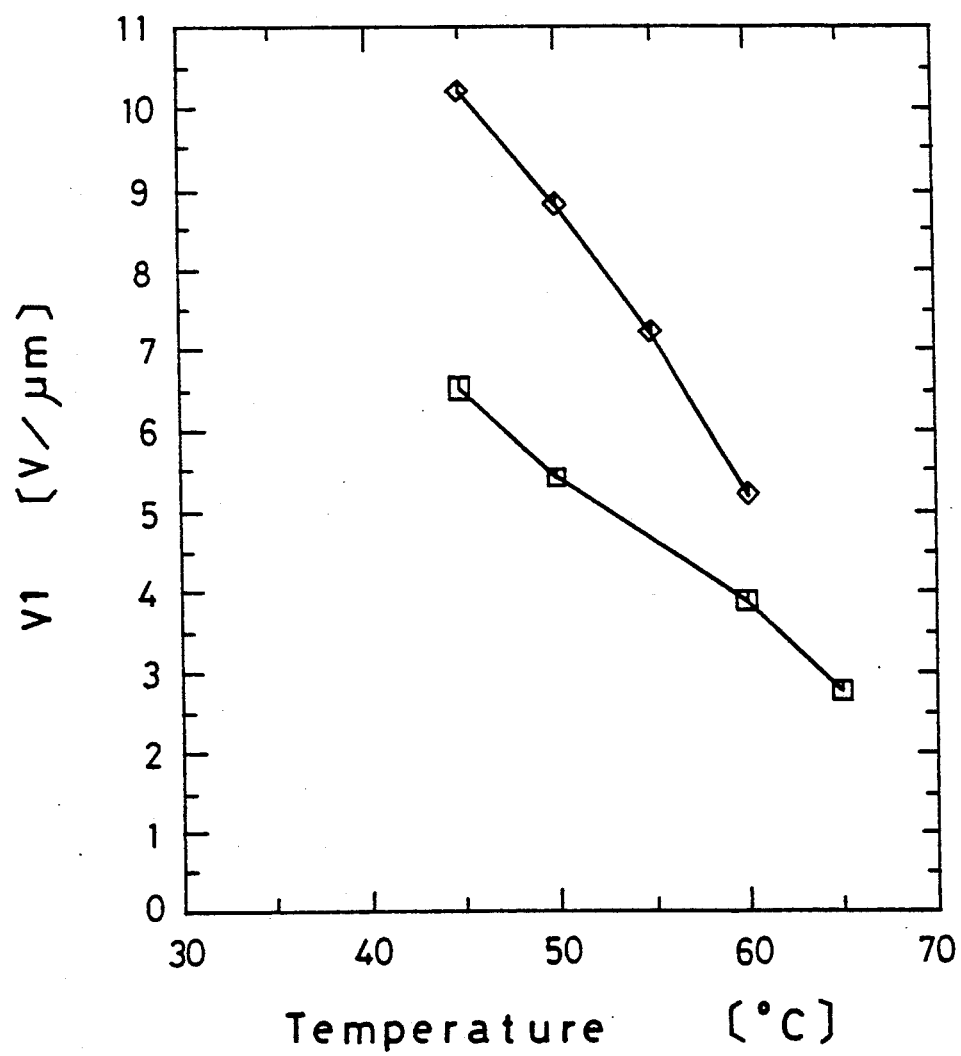
FIGS. 21 and 22 are graphs each illustrating the relation of switching voltage and temperature in the antiferroelectric liquid crystal device of the present invention.
Figure 22:
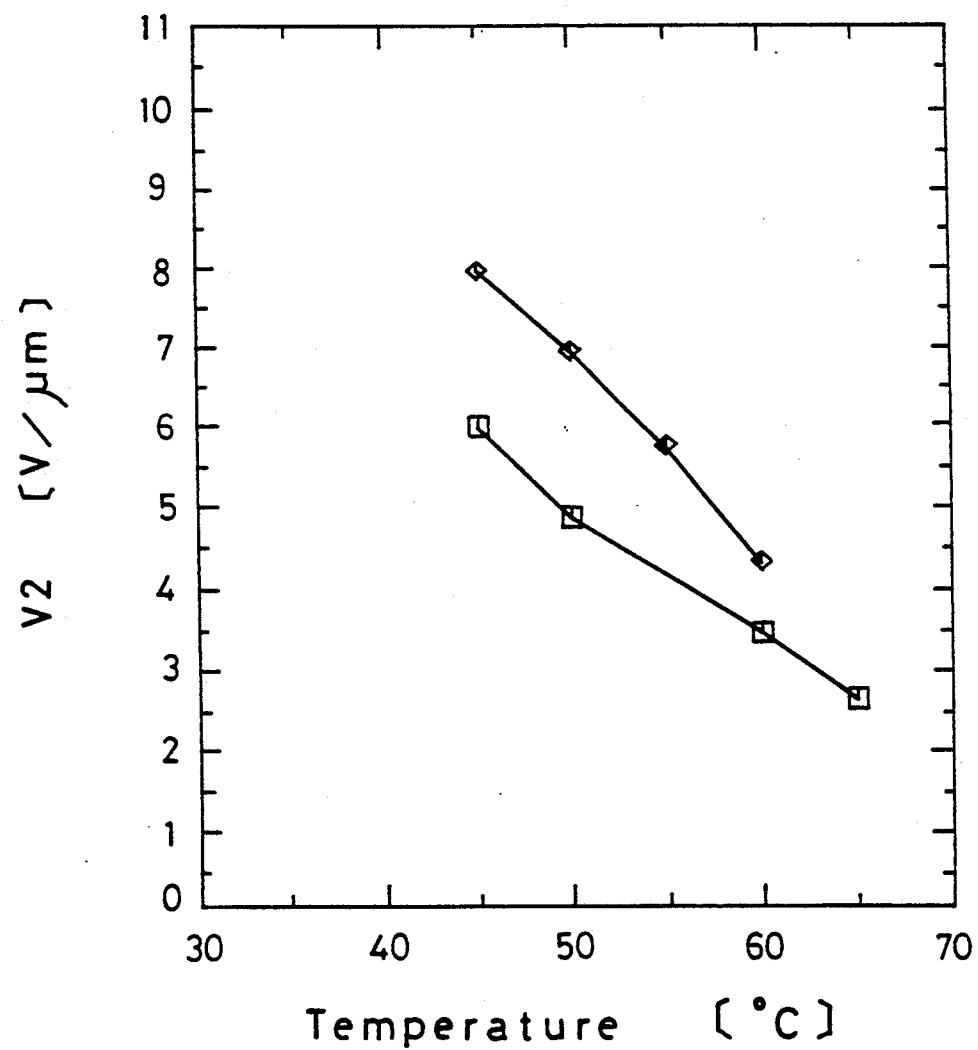
Figure 23:
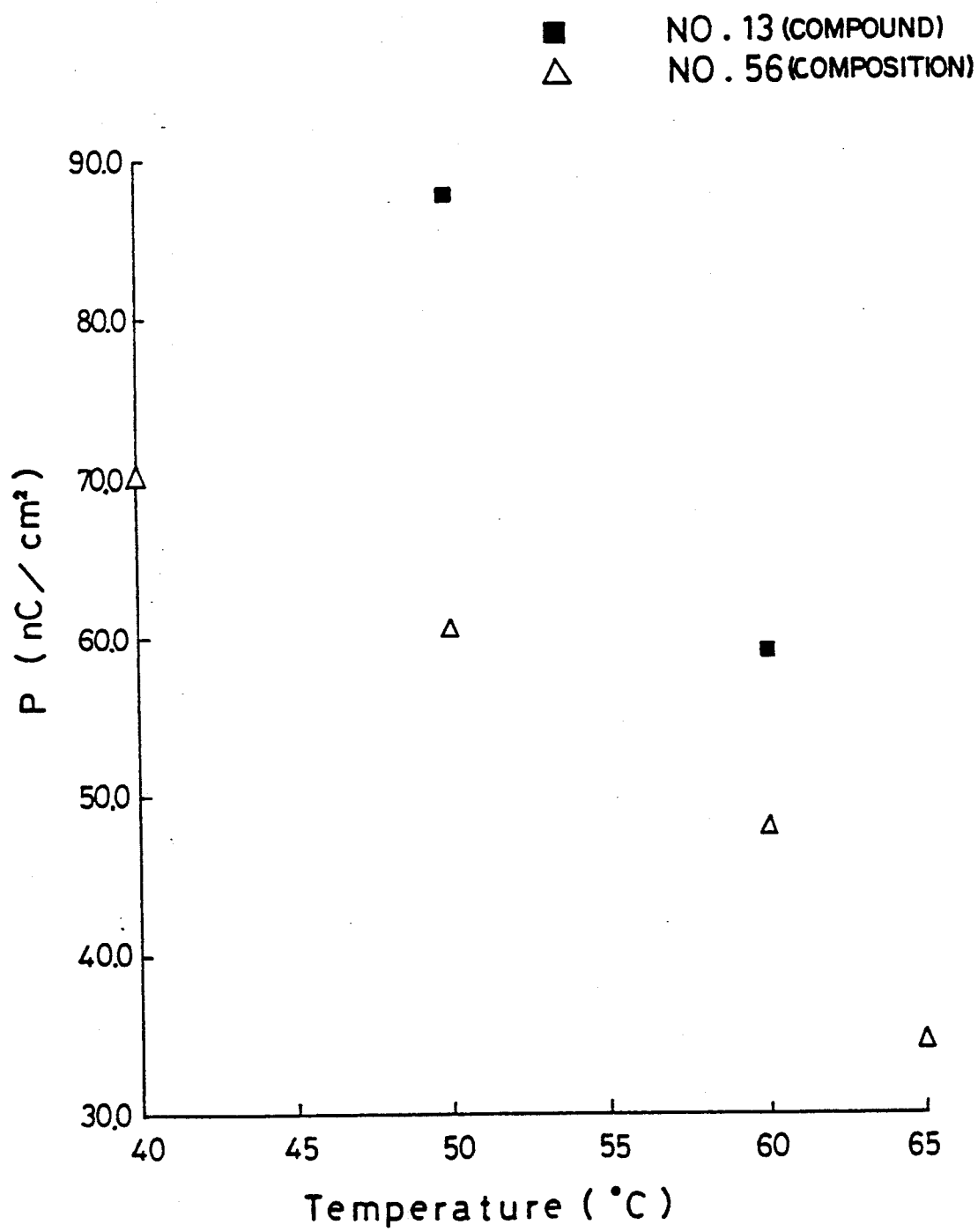
FIG. 23 is a graph illustrating a spontaneous polarization of an antiferroelectric liquid crystal composition used in the embodiment of the present invention.

The data of the compound No. 13 and the composition No. 56 are plotted in FIGS. 21 to 23.

Also in this example, the field strength (voltage) necessary for switching can be lowered by the addition of the compound that does not show an antiferroelectric liquid crystal phase.

As explained as above, according to the present invention, an antiferroelectric liquid crystal device which can be driven at a lower voltage can be provided.

What is claimed is:

1. A liquid crystal device which comprises a pair of substrates each provided with a voltage applying means, an orientation control layer disposed on at least one of the pair of substrates, and an antiferroelectric liquid crystal layer disposed between the pair of substrates, the antiferroelectric liquid crystal layer comprising a liquid crystal composition including at least one compound represented by the following general formula (I):

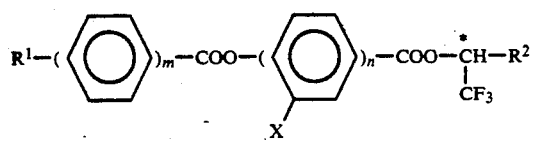

wherein $R^1$ represents an optionally substituted alkyl or alkoxy group having 1 to 15 carbon atoms, $R^2$ represents an optionally substituted alkyl group having 1 to 15 carbon atoms, X represents a hydrogen or fluorine atom, m and n independently represent an integer 1 or 2, and * represents an asymmetric carbo atom, and at least one compound represented by the following general formula (II):

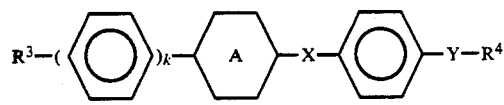

wherein $R^3$ represents an optionally substituted alkyl or alkoxy group, having 1 to 15 carbon atoms, $R^4$ represents an optionally substituted alkyl group, having 1 to 15 carbon atoms,

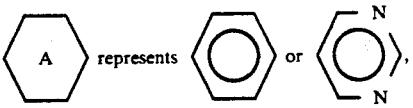

X represents a single bond or —COO—, Y represents a single bond, —o—, or —COO—, and k represents an integer 0 or 1, and in an amount sufficient to lower the voltage required for switching.

2. The device of claim 1 in which the contents of the compounds of the formulae (I) and (II) are 30 to 99 wt. % and 1 to 70 wt. %, respectively.

3. The device of claim 1 in which the contents of the compounds of the formulae (I) and (II) are 50 to 90 wt. % and 10 to 50 wt. %, respectively.

4. The device of claim 1 in which the liquid crystal composition further comprises another antiferroelectric liquid crystal compound and/or another optically active compound.

5. The device of claim 1 in which the orientation layer is an organic or inorganic layer.

6. The device of claim 1 in which the voltage applying means comprises a plurality of electrodes to provide a matrix electrode structure.

7. The device of claim 6 in which the plurality of electrodes are used as scanning electrodes or signal electrodes.